(12) United States Patent
McKay

(10) Patent No.: US 7,267,075 B2
(45) Date of Patent: Sep. 11, 2007

(54) MODULAR AND RECONFIGURABLE FROZEN CONE CONFECTION MANUFACTURING SYSTEM AND METHOD

(75) Inventor: David McKay, Burlington (CA)

(73) Assignee: Norse Dairy Systems, Inc., Columbus, OH (US)

(*) Notice: Subject to any disclaimer, the term of this patent is extended or adjusted under 35 U.S.C. 154(b) by 450 days.

(21) Appl. No.: 10/780,125

(22) Filed: Feb. 17, 2004

(65) Prior Publication Data

US 2005/0086961 A1    Apr. 28, 2005

Related U.S. Application Data

(60) Provisional application No. 60/515,141, filed on Oct. 28, 2003.

(51) Int. Cl.
*A23G 9/04* (2006.01)
*A23G 9/24* (2006.01)

(52) U.S. Cl. .............. 118/13; 118/14; 118/16; 118/24; 118/26; 426/100; 426/101

(58) Field of Classification Search .......... 118/13, 118/14, 16, 24, 26, 300, 407, 423; 99/494, 99/516; 425/118, 182; 426/100, 101; 427/236, 427/421.1, 430.1
See application file for complete search history.

(56) References Cited

U.S. PATENT DOCUMENTS

| | | | | |
|---|---|---|---|---|
| 2,282,661 | A | * | 5/1942 | Lewis .................. 118/502 |
| 2,336,649 | A | * | 12/1943 | Sportolari .............. 118/500 |
| 4,420,948 | A | * | 12/1983 | Savage ................... 62/340 |
| 4,448,114 | A | * | 5/1984 | Mayer ................... 99/494 |
| 5,007,466 | A | | 4/1991 | Mueller et al. .......... 141/1 |
| 5,127,449 | A | | 7/1992 | Mueller et al. .......... 141/1 |
| 5,419,099 | A | | 5/1995 | Mueller et al. .......... 53/473 |
| 5,524,683 | A | | 6/1996 | Mueller ................ 141/129 |
| 6,033,702 | A | * | 3/2000 | Pedersen et al. ......... 426/289 |

FOREIGN PATENT DOCUMENTS

WO    WO-00/78159 A1 * 12/2000

* cited by examiner

*Primary Examiner*—Laura Edwards
(74) *Attorney, Agent, or Firm*—Roger A. Gilcrest

(57) ABSTRACT

The present invention relates to an apparatus and method for grasping, retaining, inverting, coating and transporting a plurality of frangible conical confection shells. The present invention also relates to a modular and reconfigurable manufacturing system for producing frozen cone confections and the like.

22 Claims, 19 Drawing Sheets

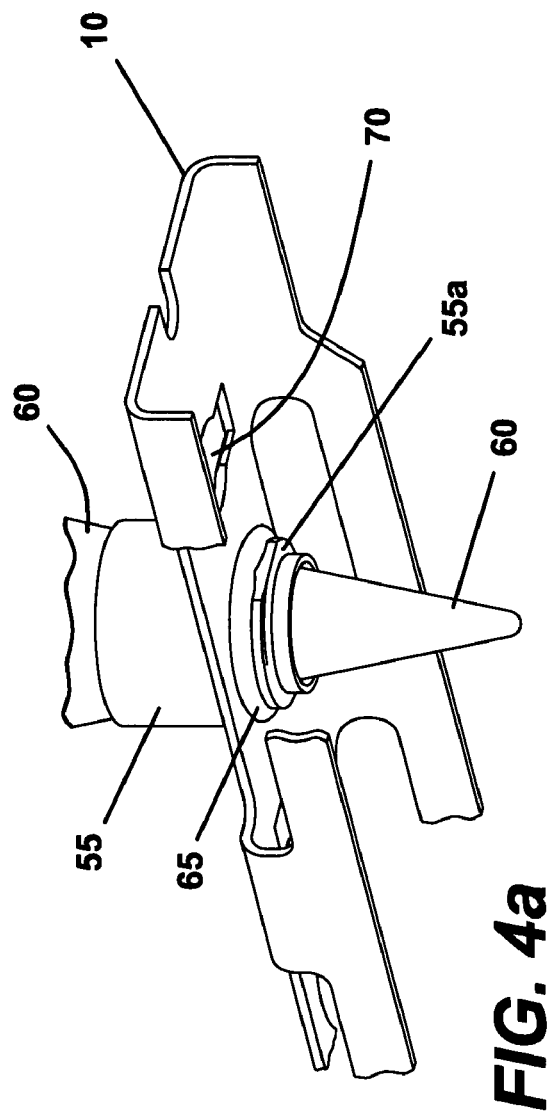
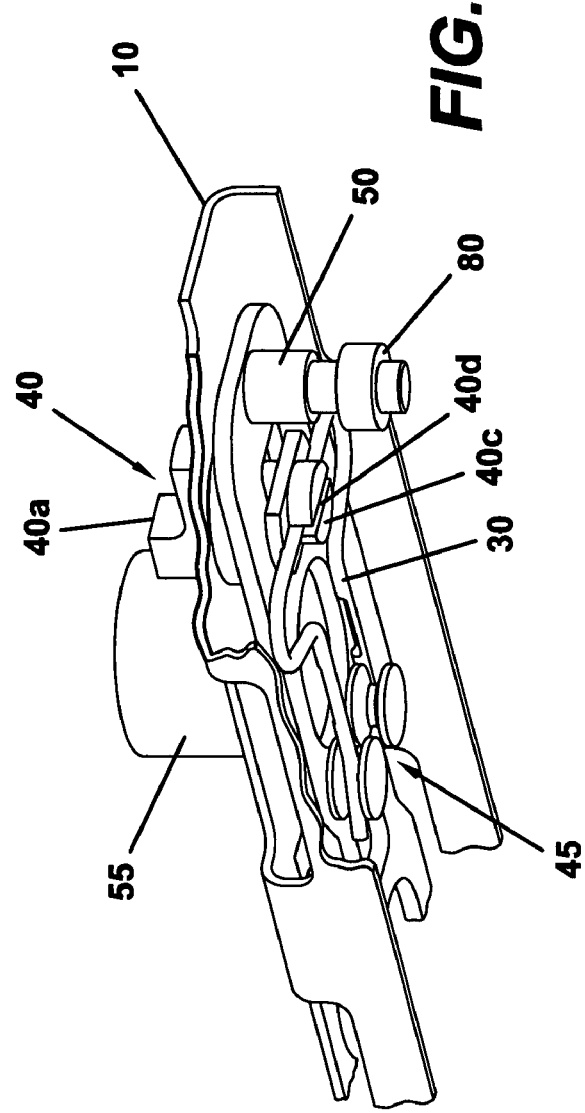

MODULAR AND RECONFIGURABLE FROZEN CONE CONFECTION MANUFACTURING SYSTEM AND METHOD

This application claims priority to U.S. Provisional Application No. 60/515,141, filed Oct. 28, 2003 entitled: CHAMBER, CONVEYOR AND DISPENSING APPARATUS AND CONVEYANCE AND DISPENSING METHODS FOR FROZEN CONFECTIONS AND THE LIKE.

TECHNICAL FIELD OF THE INVENTION

The present invention is in the field of conveyance and dispensing apparatus and methods, especially those for frozen confections and the like. More particularly, the present invention relates to apparatus and methods for safely grasping, transporting, and conveying such confections having frangible conical shells. The present invention is also related to a modular and reconfigurable system and method for optionally coating, filling, topping, and packaging confections having such shells.

BACKGROUND OF THE INVENTION

The present invention relates to grasping, transport, conveyance, coating, filling, topping and packaging apparatus, as well as grasping, transport, conveyance, coating, filling, topping and packaging methods for irregularly shaped articles and packages, such as for packaged food products as in the case of conical packages for ice cream confections and the like.

Irregularly shaped articles and packages present several problems in filling, conveyance and packaging in an industrial setting. For example, these articles are typically unbalanced and difficult to handle, whether by workers or by machinery. The weight imbalance of such articles also makes it difficult to design conveyance and packaging systems because the articles are not well suited to standard conveyance and packaging designs and protocols. Additionally, the irregular shape of such articles makes it more difficult for human hands or machinery to grasp them and repetitively, reliably, and safely transport them.

With specific regard to conical objects, such as cones, these objects have the disadvantage of having relatively little surface area upon which to apply a static or kinetic force in order to move the object in a balanced way, without the object turning on its side or otherwise precessing about its weight center. When such cones form a shell for a frozen confection or the like, there is often the added risk of breakage upon application of a force sufficient to securely grasp them.

One of the grasping methods currently used with confection cones involves piercing the cone, with or without the cone being in a paper wrapper, in order to provide for its transport to a conveyor or filling station. This grasping method often disadvantageously results in the fracture of the cone, or an otherwise less than perfect appearance to the product. With specific regard to frozen ice cream confections, these problems are multiplied by the need to move the package quickly and securely without undue force being applied thereto. Relatively rapid and safe movement is necessary to place the frozen cone confection in a package without allowing the product to warm, and without bringing to bear forces that might damage the confection shell, its contents, or any paper wrapper.

Accordingly, there remains a need for a carrier that can grasp a fragile cone while reducing the risk of fracture, and without causing any negative affect on final product appearance.

To this end, one aspect of the present invention is directed to apparatus and methods for grasping, transporting, and conveying irregularly-shaped articles, particularly frozen confections having frangible conical shells (frozen cone confections), wherein the articles can be grasped, transported, and conveyed without fracturing or otherwise damaging the frangible conical shell.

With respect to the manufacture of frozen cone confections, it is often desirable to provide a coating of the interior surfaces and/or the open end edge of the cones, such as with a chocolate or other confectionery coating. It is most advantageous to conduct this process with the cones in an inverted position. Hence, another aspect of the present invention includes a system and method for grasping, inverting, conveying, and inverting cones for frozen confections. A related aspect of the present invention is directed to coating the interior surfaces and/or the open end edge of these cones while they are in an inverted position.

Because the manufacture of frozen cone confections often requires multiple process steps, there are generally a plurality of manufacturing stations disposed along a frozen cone confection manufacturing line. Each manufacturing station is typically responsible for a particular manufacturing process step such as, for example, coating, filling, or topping. Normally, some delay, or dwell time, is required between each process step. For example, applying a chocolate coating to the interior surfaces and/or the open end edge of the cones is typically accomplished using chocolate of an elevated temperature (i.e., melted chocolate). While elevated temperatures are desirable for the coating process, they are undesirable for the filling process, which is normally the next process step to be performed. Therefore, in order to ensure that the cones are sufficiently cool so as not to melt the ice cream or other filling that has been added to the cones during the filling operation, a delay is provided between the coating and filling steps. A similar delay may be provided between the filling and topping operations, or between other process steps.

Sufficient delays (dwell times) may be accomplished by providing a predetermined conveying distance between process steps. However, once a typical manufacturing line is so constructed, it is difficult, if not impossible, to change. It can be understood that this is an undesirable situation because it severely limits the type and size of frozen confections that can be made, and inhibits the addition of other process steps. Thus, what is needed is a system and method that allows a manufacturing line to easily adapt to changing frozen confection designs or recipes.

Accordingly, yet another aspect of the present invention provides a frozen cone confection manufacturing system and method that offers flexibility in terms of the number and type of coating, filling and/or topping components. Many of these components will require variation in the order and timing of their dispensing, so as to obtain a final product of desirable quality in terms of the proper blending of fill components, the adhesion of toppings, and the overall appearance of the final confection. This aspect of the present invention allows for greater flexibility in the design and manufacture of frozen cone confections, as will be described in greater detail below.

Although described in terms of an apparatus and method for use with conical ice cream confection products, advantages of the present invention with respect to other applications may become apparent from the present disclosure or through practice of the invention.

SUMMARY OF THE INVENTION

The present invention includes apparatus and methods for grasping, transporting, conveying, and packaging conical confection shells—without damaging the shells such as through piercing or the like. The present invention also includes a system and method for grasping, inverting, conveying, and coating a frangible conical confection shell, or some portion thereof. The present invention further includes a modular and reconfigurable manufacturing system and method, such as may be used to manufacture frozen cone confections. Preferred embodiments of the present invention overcome some or all of the aforementioned problems.

One aspect of the present invention includes an apparatus for grasping a frangible conical confection shell. One exemplary embodiment of a conical shell grasping/retaining apparatus of the present invention comprises: (a) a carrier plate having first and second sides, the carrier plate having a plurality of receiving apertures, each adapted to accept a frangible conical confection shell from the first side; (b) a pair of support plates residing adjacent to the second side of the carrier plate and slidably coupled thereto, each of the support plates having a plurality of receiving apertures located to be aligned with the apertures in the carrier plate and adapted to accept a frangible conical confection shell; (c) a retaining pin associated with each receiving aperture and residing adjacent to a bottom side of each support plate, each retaining pin having a pair of opposed arms moveable between a closed position and an open position for grasping and releasing a confection shell, respectively; (d) a guide post associated with each retaining pin, the guide posts for slidably coupling the support plates to the carrier plate and for securing each retaining pin; (e) a pair of actuators associated with each retaining pin and attached to the bottom side of each support plate, the pairs of actuators provided to move the opposed arms of the retaining pins between the closed position and the open position upon slidable displacement of the support plates; and (f) an actuating means, such as an activating pin attached to one end of each support plate, the actuating means for causing slidable displacement of the support plates.

In this exemplary embodiment of the present invention, the retaining pin consists of a single loop of flexible material that is closed at one end and that embodies the pair of opposed arms at the opposite end. The opposed arms of each retaining pin are adapted to be flexed between a relatively open (released) position and a relatively closed (gripping) position by slidable engagement with the actuator pairs attached to the bottom of each support plate. Each pair of opposed arms may employ flattened surfaces or some other structure that better permits each retaining pin to engage a conical shell.

Actuation of this embodiment of a grasping/retaining apparatus generally occurs as the apparatus is moved along a conveyor with which it may be fixedly or removably associated. The motion of the support plates may be driven by any one or more means positioned at the desired points of gripping and release along the transport path of the conveyor. For example, a cam may be associated with the conveyor and adapted to cause an outwardly directed slidable displacement of each support plate at certain locations along the conveyor. This outwardly directed slidable displacement of the support plates acts to open the retaining pins, allowing cones to be inserted to or removed from the apparatus, such as during initial loading, for example. A release point may in turn be provided with another means, such as another cam, to provide for release of the cones when and where along the transport path the cones are to be released, such as after coating is completed. Such cams may cause slidable displacement of the support plates by contacting the locating pins that are attached thereto.

Displacement of the support plates to place the retaining pins in a closed (gripping) position may occur in various ways in this embodiment of the apparatus. For example, absent an opposite-acting displacement force, such as that described above, the natural spring force of the retaining pins will tend to bias the support plates toward a position wherein the retaining pins are in a closed (gripping) position. Alternatively, a cam or other similar means may be provided to forcibly move the support plates to such a position as the apparatus moves along the conveyor.

It is also preferred that a cylindrical cone-holding member be provided to extend through each aperture in the carrier plate. The cylindrical cone-holding members may also extend through the apertures in the support plates.

The present invention may additionally comprise a transport mechanism adapted to move the apparatus from a position wherein a conical shell is held upright to a position wherein the conical shell is held in an inverted position, and to convey the conical shell while held in the inverted position.

The present invention also includes a method for grasping, inverting and transporting a plurality of frangible conical confection shells. In general, this method comprises the steps of: (1) providing at least one conical shell grasping/retaining apparatus described above; (2) placing the pairs of opposed arms of the apparatus(es) in an open position; (3) placing a confection shells in an upright position in each of the apertures; (4) placing the pairs of opposed arms in a closed position; (5) inverting the apparatus(es) so as to place the confection shells in an inverted position; (6) transporting the apparatus(es) from a first point to a second point; and (7) again inverting the apparatus(es) so as to place the confection shells in an upright position. This method may additionally comprise the steps of: (8) placing the pairs of opposed arms in the open position; and (9) removing the conical shells from the apertures.

The present invention also generally includes a method of grasping, inverting and transporting a plurality of frangible conical confection shells, the method comprising the steps of: (1) placing a plurality of conical confection shells in a upright position in a conical shell grasping/retaining apparatus; (2) inverting the plurality of conical confection shells without piercing the conical confection shells; (3) transporting the apparatus from a first point to a second point; and (4) again inverting the plurality of conical confection shells so as to place the conical confection shells in an upright position. This method may comprise the additional step of: (5) moving the conical confection shells from the second point to a third point.

One of the advantages of the conical shell grasping/retaining apparatus and method(s) of the present invention includes the use of pin-less carriers that do not rely upon piercing of the shell for the retainment thereof. In the case of products such as frozen cone confections, this improves product appearance and reduces waste occasioned by broken shells.

Another aspect of the present invention includes a system for grasping, inverting, and coating a frangible conical confection shell. One embodiment of such a system comprises the aforementioned conical shell grasping/retaining apparatus in conjunction with a transport mechanism adapted to move the apparatus from a position wherein the conical shell is held upright to a position wherein the conical shell is held in a inverted position, and to convey the conical shell while held in the inverted position. One embodiment of this system further includes a liquid dispenser disposed under the transport mechanism and arranged to propel a liquid upward, such that the interior of each conical shell is provided with a coating of the liquid while in the inverted position. The liquid dispenser preferably may be selected from the group consisting of sprayers and bubblers. Alternatively, or additionally, such a system may make use of a liquid bath disposed under the transport mechanism and adapted to be lifted upward so as to provide a liquid coating to the open end edge of each conical shell.

This aspect of the present invention also includes a method for grasping, inverting and coating a plurality of frangible conical confection shells. In general terms, this method includes the steps of: (1) providing the conical shell grasping/retaining apparatus described above; (2) placing the pairs of opposed arms of the apparatus in an open position; (3) placing a confection shell in an upright position in each aperture thereof; (4) placing the pairs of opposed arms of the apparatus in a closed position; (5) inverting the support plate so as to place the confection shells in an inverted position; (6) coating the interior surface and/or the open end edge of the confection shells; and (7) again inverting the support plate so as to place the confection shells in an upright position. This method may comprise the additional steps of: (8) placing the pair of opposed arms in the open position; and (9) removing the conical shells from the apertures.

This aspect of the present invention also includes an alternate method of grasping, inverting, coating and transporting a plurality of frangible conical confection shells, the method comprising the steps of: (1) placing a plurality of conical confection shells in a upright position; (2) inverting the plurality of conical confection shells without piercing the conical confection shells; (3) coating the interior surface of the confection shells; and (4) again inverting the plurality of conical confection shells so as to place the conical confection shells in an upright position. This method may additionally comprise the step of moving the conical confection shells from a first point to a second point.

One advantage of a system and method for grasping, inverting, and coating frangible conical confection shells according to the present invention is that the cones are held in such a way that the grasping apparatus is not exposed to the coating material. Hence, unlike the cone-piercing method and devices therefor, the system and methods of the present invention reduce the need for cleaning portions of the apparatus.

Yet another aspect of the present invention is directed to a modular and reconfigurable system and method of use for optionally, coating, filling, and/or topping a confection having a conical shell, particularly a frozen cone confection. This aspect of the present invention provides a frozen cone confection manufacturing system and method that offers flexibility in terms of the number and type of coating, filling or topping components.

The modular and reconfigurable manufacturing system makes use of modular manufacturing stations that may be relocated along the length of a frozen cone confection manufacturing line. Servo-motors are provided to allow for vertical motion of any of the stations along the horizontal guide rods. The process stations can be located along the frozen cone confection manufacturing line as necessary to provide for the correct delay (dwell) time between process steps.

Preferably, servo motors or similar drive means are also provided to allow for vertical movement of certain process equipment associated with the various modular manufacturing stations. For example, movement of cone spraying, dipping, or filling devices toward or away from the cones may be servo controlled.

An advantage of the modular and reconfigurable manufacturing system and method of the present invention is the flexibility of design afforded thereby. In the past, manufacturing stations have generally been located at fixed points along a frozen cone confection manufacturing line. Consequently, designs for frozen cone confections are generally limited by the manufacturing line on which they will be produced. In contrast, the modular and reconfigurable manufacturing system and method of the present invention affords a manufacturer the ability to easily produce products having different characteristics and requiring different processing parameters on a single manufacturing line.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 4a is an enlarged perspective view in partial cutaway, showing an optional conical shell receptacle attached to a carrier plate portion of the apparatus of FIGS. 1-3, with a conical shell passing therethrough;

FIG. 4b is an enlarged perspective view in partial cutaway showing in detail the assembled relationship between certain components of the conical shell grasping and retaining apparatus of FIGS. 1-3;

DETAILED DESCRIPTION OF EXEMPLARY EMBODIMENTS

In accordance with the foregoing summary, the following presents a detailed description of several exemplary embodiments of the present invention, wherefrom a better understanding of the subject matter of the present invention may be derived.

Figure 1:
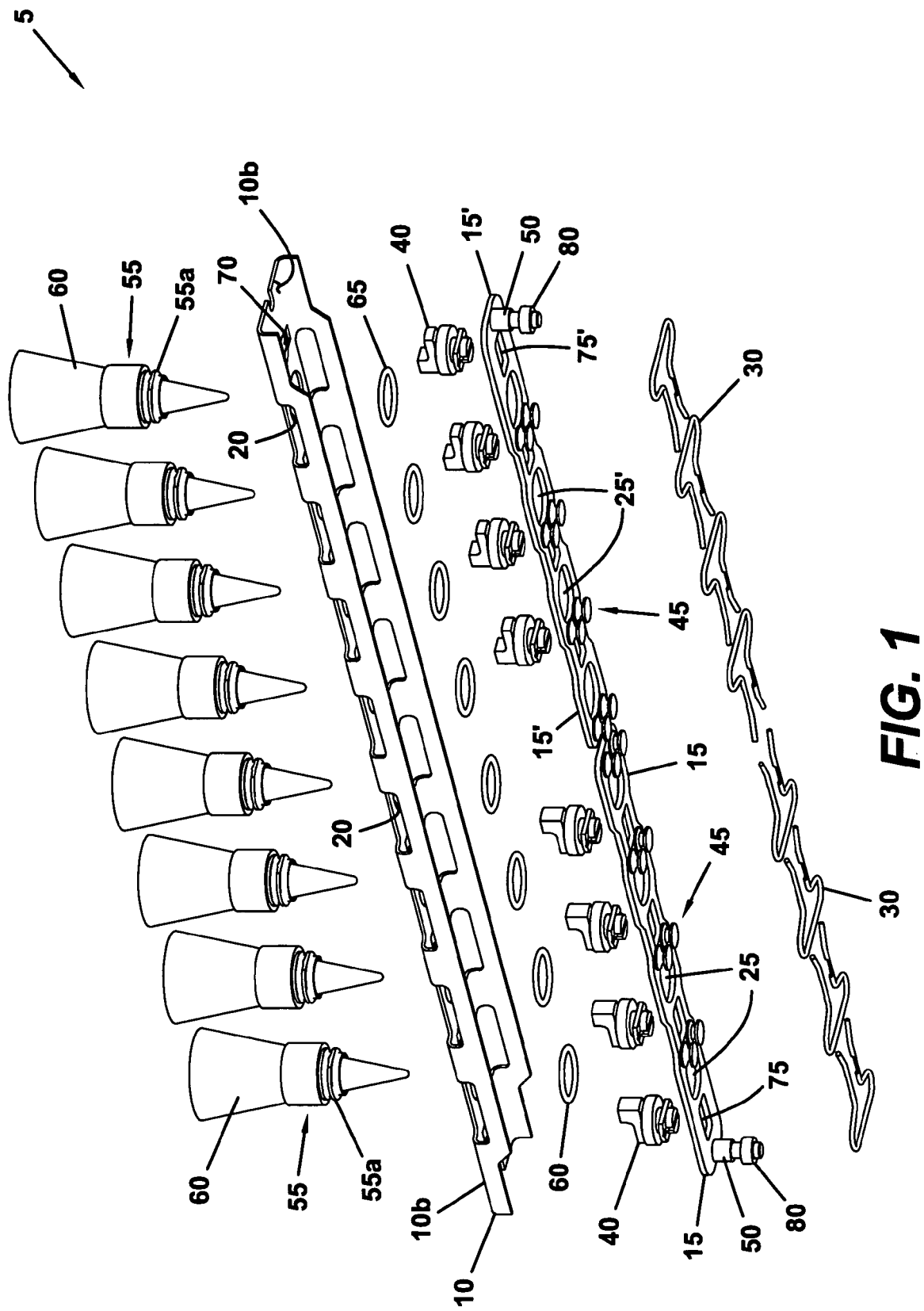
FIG. 1 is an exploded perspective assembly view of a conical shell grasping and retaining apparatus in accordance with one embodiment of the present invention.

One aspect of the present invention includes a conical shell grasping and retaining apparatus and its method of use. FIG. 1 shows an exploded assembly view of a conical shell grasping and retaining apparatus 5 in accordance with one embodiment of the present invention. As can be seen in FIG. 1, the apparatus 5 includes an upper carrier plate 10 and a pair of lower support plates 15, 15'. Both the carrier plate 10 and each of the support plates 15, 15' are provided with a plurality of conical shell receiving apertures 20, 25, 25', respectively. Each conical shell receiving aperture 20, 25, 25' is designed to allow a portion of a conical shell 60 to pass therethrough. Hence, the conical shell receiving apertures 25, 25' in each support plate 15, 15' are located to be aligned with corresponding ones of the conical shell receiving apertures 20 in the carrier plate 10. A number of retaining clips 30 are provided for the grasping of a portion of the conical shells 60 that pass through the conical shell receiving apertures 20, 25, 25' in the carrier plate 10 and support plates 25, 25'. The number of retaining clips 30 typically corresponds to the number of apertures 20. For example, in this particular embodiment of the conical shell grasping/retaining apparatus 5 there are a total of eight conical shell receiving apertures 20, thus, there are eight retaining clips 30. A guidepost 40 and an actuator pair 45 is also provided for each retaining clip present. An activating pin 50 is located on an outward facing end of each support plate 15, 15'. Preferably, a cylindrical conical shell receptacle 55 is also provided for each conical shell receiving aperture 20 present.

Figure 2:
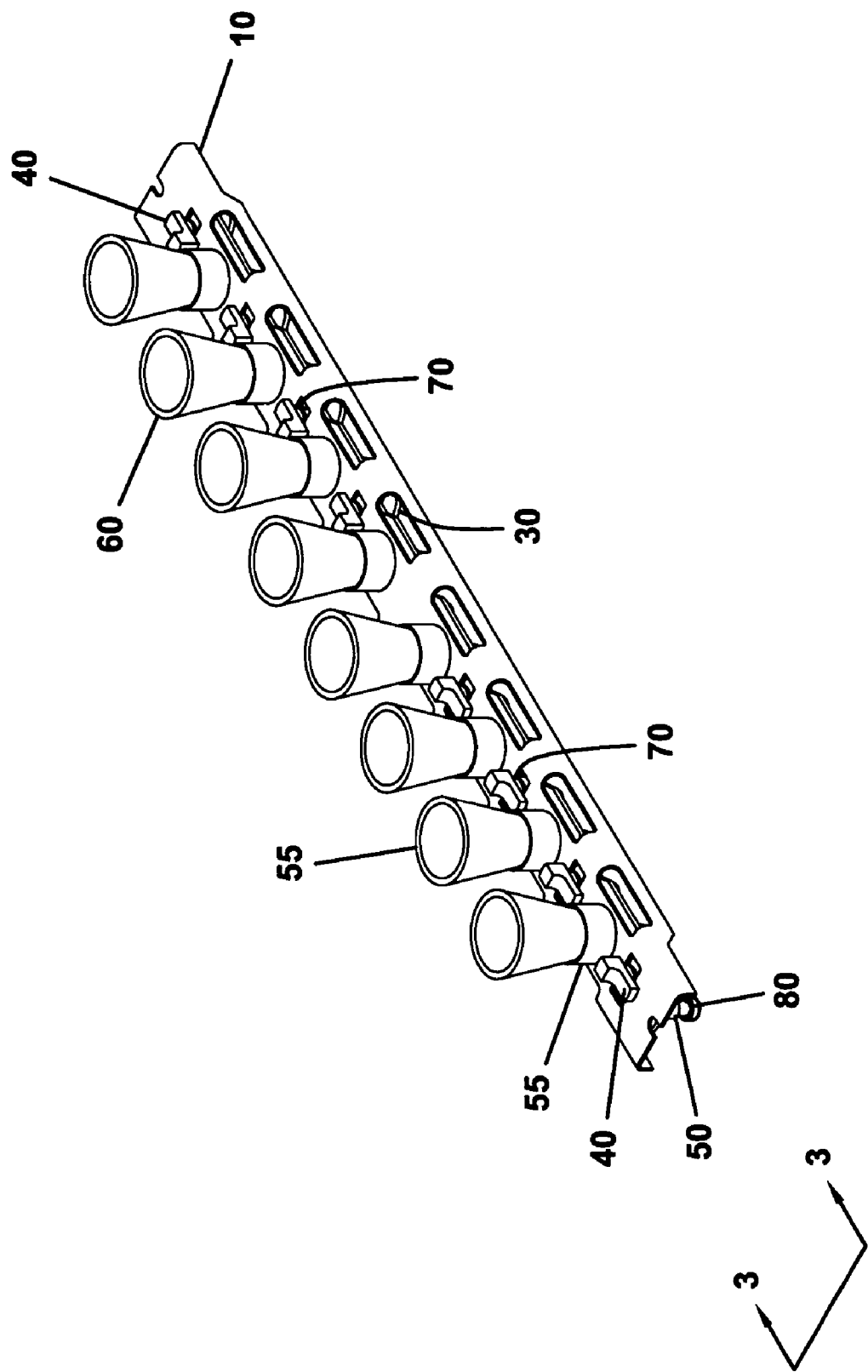
FIG. 2 is a perspective view of the assembled conical shell grasping and retaining apparatus of FIG. 1.
Figure 3:
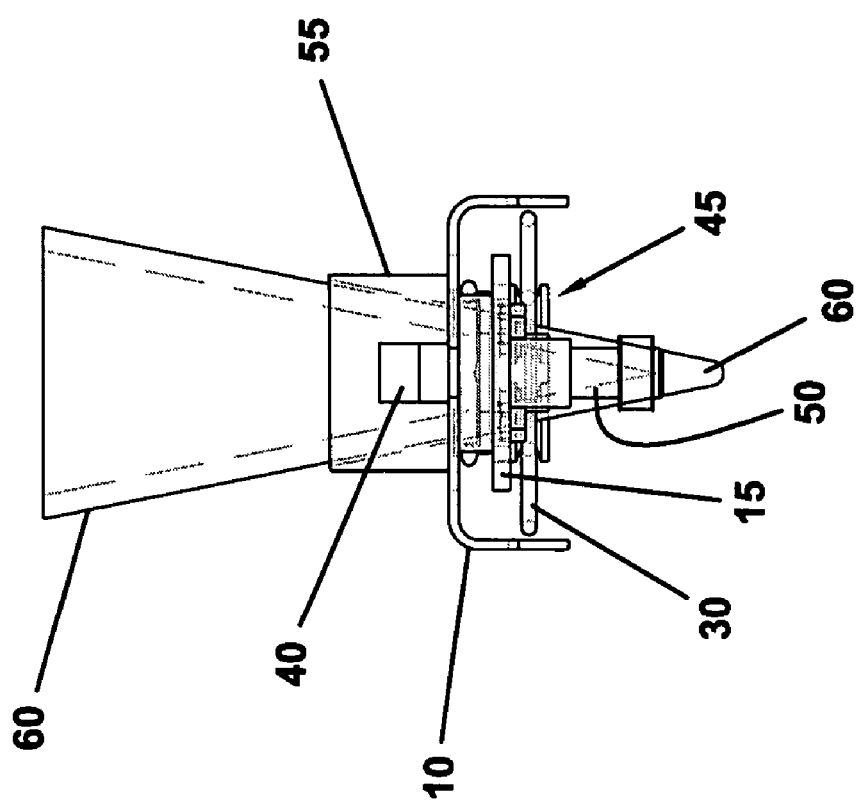
FIG. 3 is a side elevational view of the assembled conical shell grasping and retaining apparatus of FIG. 2.
Figure 4C:
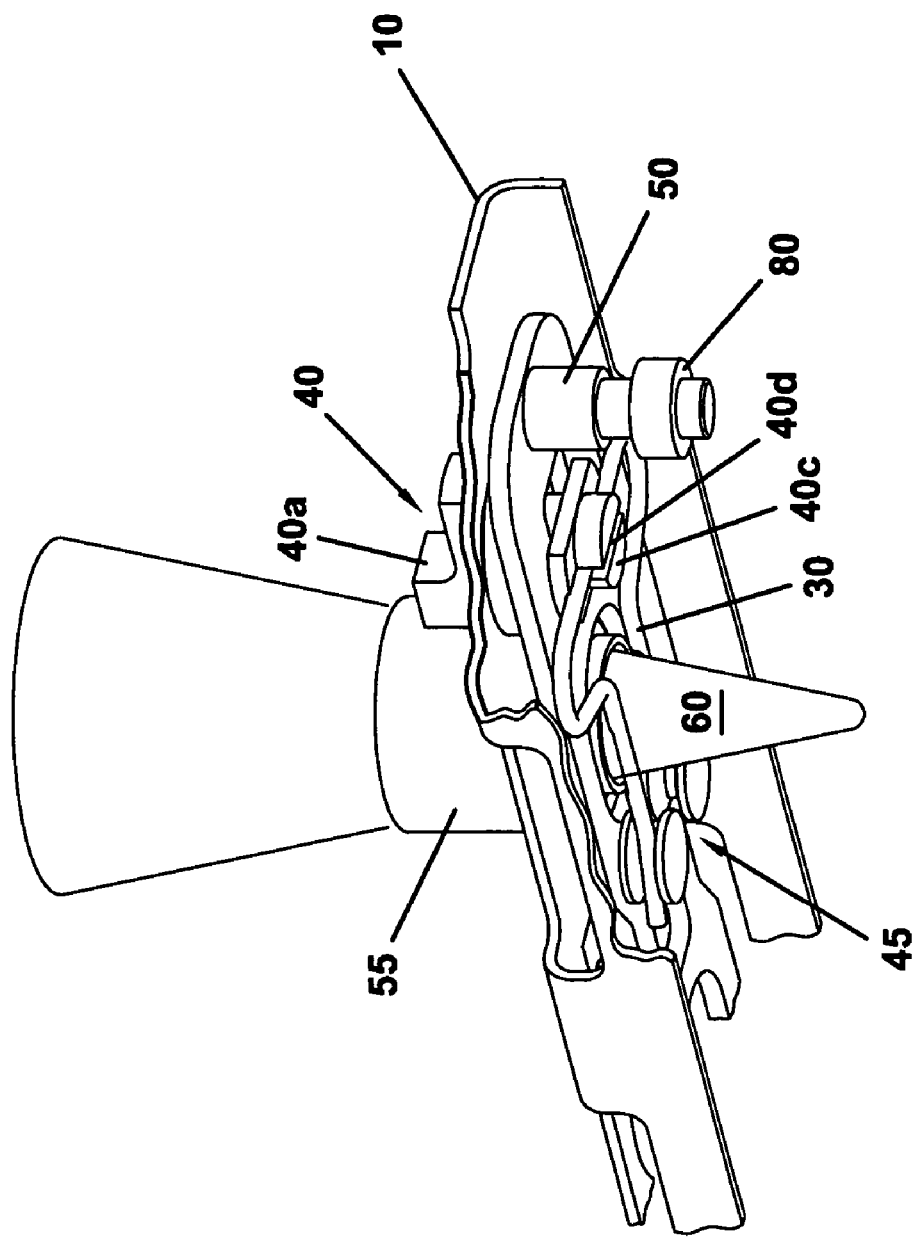
FIG. 4c is the enlarged perspective view of FIG. 4b, illustrating in further detail how the conical shell is retained by the grasping/retaining apparatus.

The assembled relationship of the components of the conical shell grasping/retaining apparatus 5 can be best observed by reference to FIGS. 2-4. As can be seen in FIGS. 2-3, the conical shell receptacles 55 are installed to the carrier plate 10 such that a lower portion 55a thereof protrudes through the conical shell receiving apertures 20 of the carrier plate. The lower portion 55a of the conical shell receptacles 55 may or may not extend into the conical shell receiving apertures 25, 25' in the support plates 15, 15'. In this particular embodiment of the apparatus 5, the conical shell receptacles 55 are secured to the carrier plate 10 by means of an o-ring 65.

The guideposts 40 are designed to slidably connect the support plates 15, 15' to the carrier plate 10, which arrangement can be best understood by reference to FIGS. 2-4. More specifically, a portion of each guidepost 40 is designed to pass through a guidepost receiving aperture 70, 75, 75' in the carrier plate 10 and support plates 15, 15', respectively. Each guidepost 40 is provided with an upper portion 40a that protrudes from a first side 10a of the carrier plate 10 after assembly. The guidepost 40 is secured to the carrier plate 10 by trapping of the carrier plate in a groove formed between the upper portion 40a and a larger intermediate portion 40b of the guidepost. Similarly, the support plates 15, 15' are retained on the guideposts 40 by trapping the support plates in a grove formed between the intermediate portion 40b and a lower portion 40c of each guidepost. In this particular embodiment of the conical shell grasping/retaining apparatus 5, the guidepost receiving aperture 70 in the carrier plate 10 has a length dimension that extends in a substantially perpendicular direction to the length dimension of the guidepost receiving aperture 75, 75' in each support plate 15, 15'. Each of the upper portion 40a and lower portion 40c of each guidepost can also be seen to have a shape and orientation similar to its respective receiving aperture 70, 75, 75'. Therefore, when the guideposts 40 are properly oriented, the upper portion 35a thereof will pass through the guidepost receiving apertures 70 in the carrier plate 10 and the lower portion 40c thereof will pass through the guidepost receiving apertures 75, 75' in the support plates 15, 15'. Upon rotation of the guideposts 40, however, the carrier plate 10 and the support plates 15, 15' will become engaged therewith. In FIG. 2, the guideposts 40 are shown to be rotated approximately 90 degrees from the installation position. When the support plates 15, 15' are properly coupled to the carrier plate 10 via the guideposts 40, the support plates are substantially parallel with, and adjacent to, a bottom side 10b of the carrier plate. Because the guidepost receiving apertures 75, 75' have a dimension along the length direction of each support plate 15, 15' that is larger than the portion of the guidepost 40 residing therein, each support plate is displaceable with respect to the carrier plate 10 in a direction along the length thereof.

An improved understanding of retaining clip 30 retention and operation can be gained by reference to FIGS. 3-5. As can be observed therein, the lower portion 40c of each guidepost 40 is adapted to receive a portion of a corresponding retaining clip 30. In this particular embodiment of the conical shell grasping/retaining apparatus 5, the lower portion 40c of each guidepost 40 is provided with a groove 40d to engage a closed end 30a of each retaining clip 30, although other methods of engagement are also possible.

Consequently, the guideposts 40 prevent the retaining clips 30 from being displaced along with the support plates 15, 15'.

Retaining clip 30 actuation is achieved by contacting an open end 30b of each retaining clip 30 with a corresponding actuator pair 45 during displacement of the support plates 15, 15'. As can best be observed in FIG. 4, due to the opposing orientation of the retaining clips 30 associated with each support plate 15, 15', an outward displacement of the support plates will cause the open end 30b of each retaining clip to expand, thereby resulting in a release of any conical shells 60 protruding through the cone receiving apertures 25, 25'. In contrast, an inward displacement of the support plates will cause the open end 30b of each retaining clip to contract, thereby resulting in a gripping of any conical shells 60 protruding through the cone receiving apertures 25, 25'.

Figure 5C:
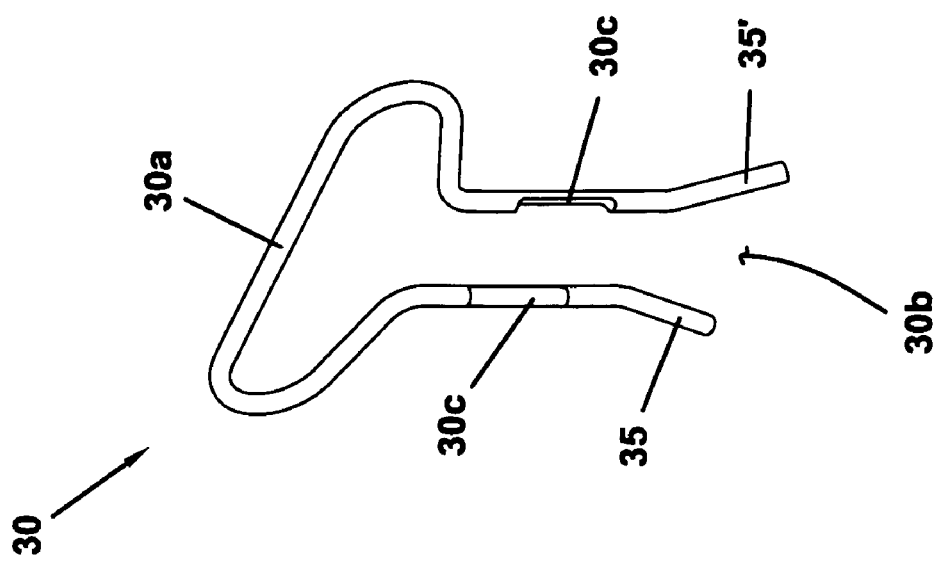
FIGS. 5a, 5b and 5c show a top plan, side elevational, and perspective view, respectively, of the retainer clip visible in FIGS. 1-4.
Figure 5B:
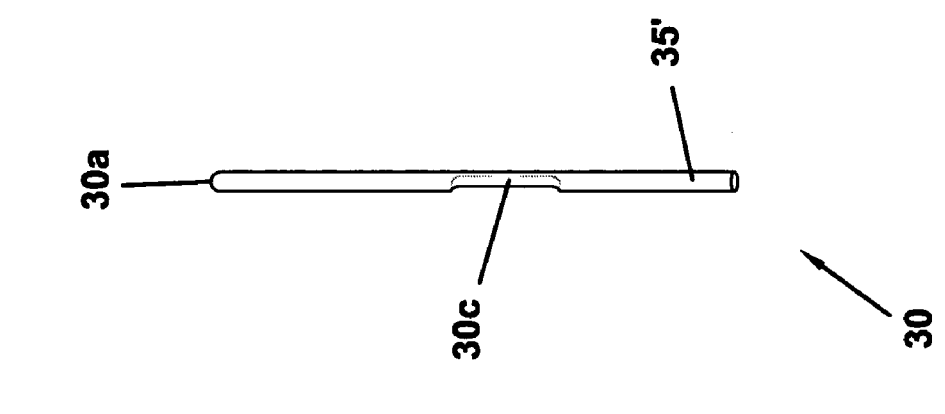
Figure 5A:
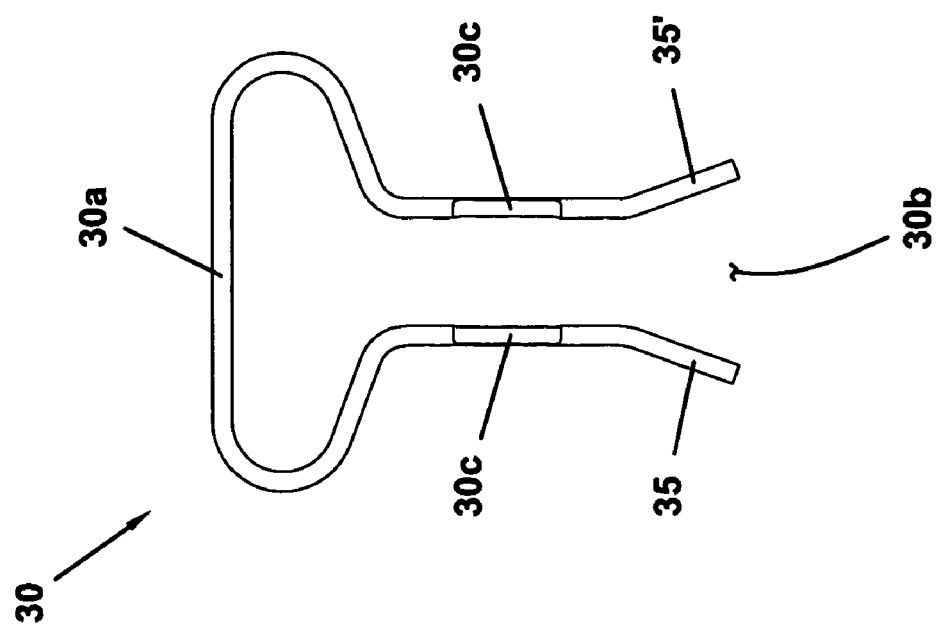

Several enlarged views of the particular embodiment of the retaining clip 30 shown in FIGS. 1-4 can be seen by reference to FIGS. 5a-5c. As can be seen, this particular retaining clip 30 consists of a single length of substantially round material that has been repeatedly bent to produce the desired shape. The retaining clip 30 has a closed end 30a, which is adapted to engage the groove 40d in the lower portion 40c of each guidepost 40. Extending from the closed end 30a of the retaining clip 30 are two opposed arms 35, 35' that terminate at opposite sides of an open end 30b of the retaining clip. Consequently, the design of the retaining clip 30 allows for an inward and outward flexing of the opposed arms 35, 35'. In this regard, it is preferred that the retaining clip 30, or at least the opposed arms 35, 35' thereof, be constructed from a resilient material. The use of a resilient material allows the opposed arms 35, 35' of the retaining clip 30 to quickly spring back into shape after being displaced.

The particular retaining clip 30 used in this embodiment of the apparatus 5 is also shown to have an optional flat area 30c located on each of its opposed arms 35, 35'. The flat areas 30c are employed to provide improved grasping of the conical shells 60 by the retaining clips 30. More specifically, in this particular embodiment, the flat areas 30c increase the area of contact between each of the opposed arms 35, 35' of the retaining clips 30 and the angled outer surface of the conical shells 60 (see particularly, FIGS. 4b and 4c). It can be understood that many other techniques, such as, for example, mechanical grippers or surface treatments may also be used in conjunction with the retaining clips 35 in order to further improve the grasping of the conical shells 60, and such is considered within the scope of the present invention.

Figure 6:
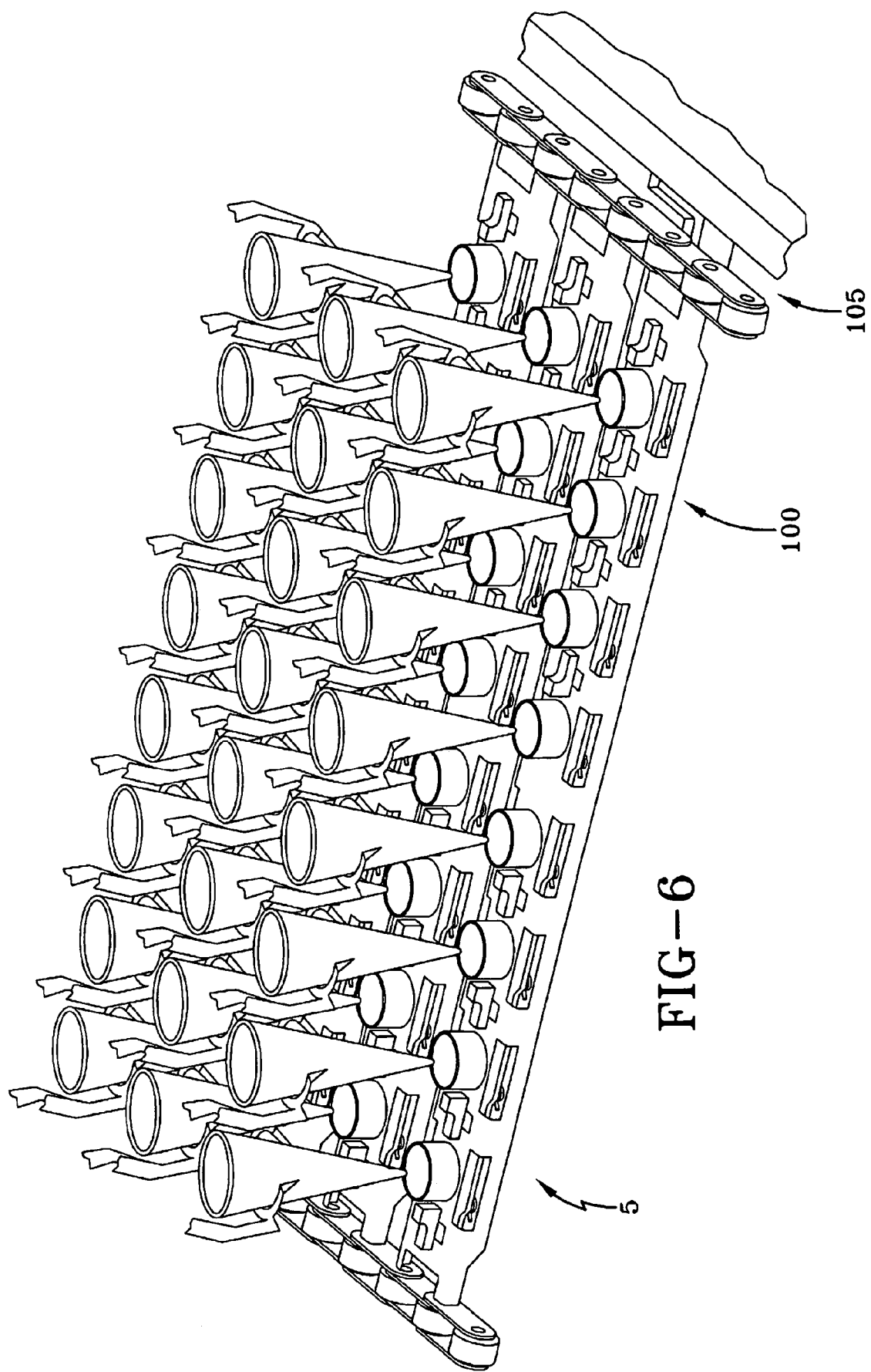
FIG. 6 is a perspective view depicting a plurality of the conical shell grasping and retaining apparatuses installed to a portion of a conveyor.

A plurality of the conical shell grasping/retaining apparatuses 5 of the present invention are shown to be releasably affixed to a conveyor 100 in FIG. 6. A conical shell loader/unloader is also shown to be positioned above the conveyor 100 in order to better illustrate one method for loading conical shells to the apparatuses 5. Generally, the conveyor 100 will be an endless conveyor (such as that shown), wherein when traveling along a top portion of the conveyor the apparatuses 5 are maintained in an upright position, and when traveling along a bottom portion of the conveyor the apparatuses are maintained in an inverted position. Such a conveyor may be continuously moving, or may be an indexing-type conveyor. Of course, the apparatus 5 of the present invention can also be used with other types of conveyors. When used in conjunction with a conveyor 100 such as that shown in FIG. 6, the apparatuses 5 will normally be carried along by chains, belts, or some other similar type of drive mechanism. As can be understood with respect to such a conveyor 100, a framework 105 will typically be provided for support, a portion of which commonly resides between the top and bottom portions thereof. The framework may also be operative to support end shafts, rolls, drive motors, and various other items commonly used to construct conveyors.

In this particular embodiment of the present invention, cams (not shown) or similar contacting structures are preferably located at one or more positions along the length of the conveyor 100. Although such cams will typically reside along the top portion of the conveyor, it is also possible that such cams may be located along the bottom portion of the conveyor. In this embodiment, the cams are provided to engage with the activating pins 50 located on each support plate 15, 15' of the apparatus. Preferably, the cams actually contact a bushing 80 affixed to each of the activating pins 50. The bushing 80 may be a roller bearing or similar device. The bushing 80 may also simply be a plastic (such as nylon) element, or an element constructed from some other material that protects the cams and the activating post from damage during contact. Preferably, the bushing 80 is made from a material that has good wear characteristics.

Figure 7:
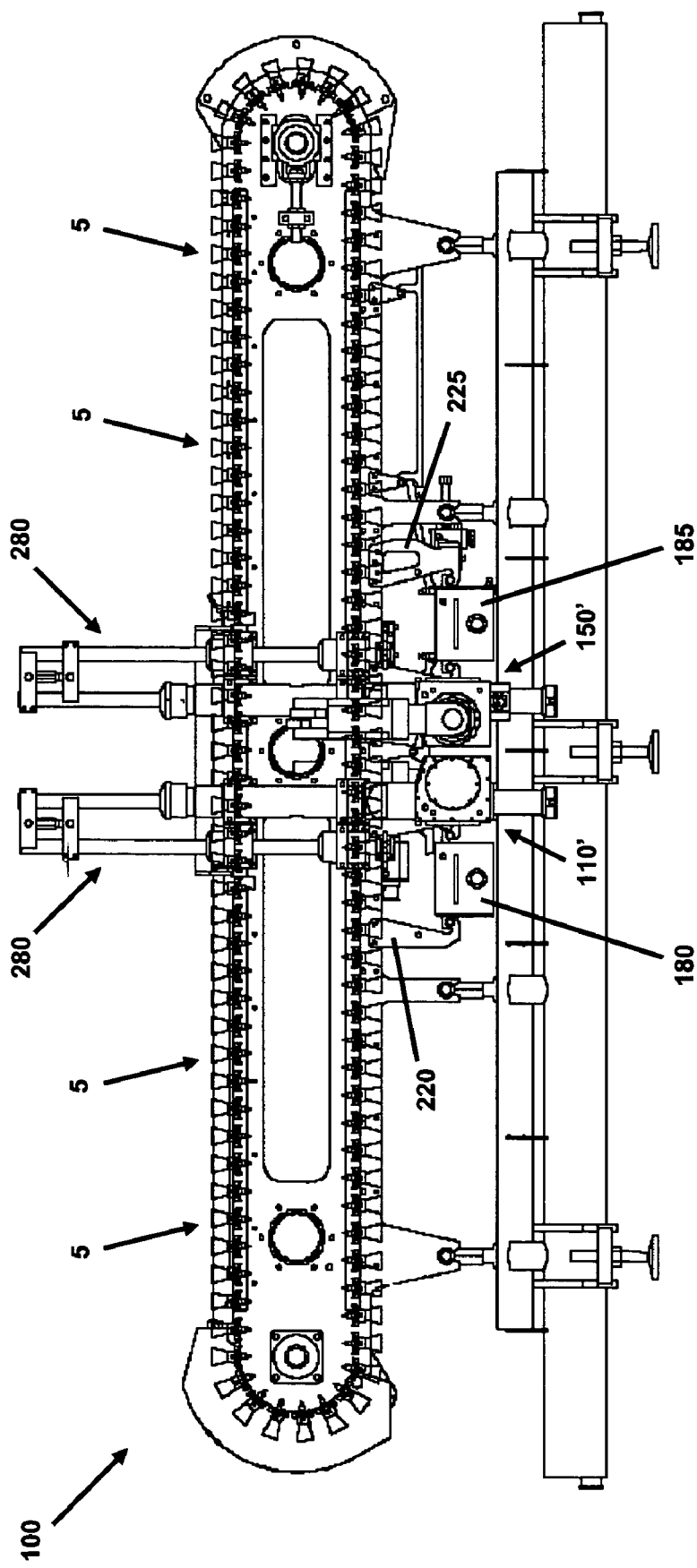
FIG. 7 is a side elevational view of the entirety of the conveyor shown in FIG. 6, wherein it can be seen that the conical shell grasping/retaining apparatuses are disposed substantially completely around the conveyor.

As can be understood from a review of preceding drawing FIGS. 1-4 and reference to FIGS. 6 and 7, when this particular embodiment of the conical shell grasping/retaining apparatus 5 is affixed to the conveyor 100, the activating pins 50 extend into an interior portion thereof. That is, when the apparatuses 5 are traveling along the top portion of the conveyor 100 the activating pins 50 will be directed substantially downward, and when the apparatuses are traveling along the bottom portion of the conveyor the activating pins will be directed substantially upward. When an apparatus 5 is traveling around an end of the conveyor 100, the activating pins will point in some direction into the area between the top and bottom of the conveyor. As can be seen, the apparatuses 5 are designed such that their length is slightly less than the width of the conveyor frame 105. Thus, as the apparatuses 5 travel along the conveyor 100, the activating pins 50 are located within an area bounded by the inside edges of the conveyor frame 105. Normally, there will be some gap between the activating pins 50 and the conveyor frame 105. At locations along the conveyor 100 where it is desired to place the apparatuses 5 in a state wherein conical shells 60 may be loaded thereto or removed therefrom, cams may be employed to contact the activating pins 50.

By reference to the detailed assembly view of FIG. 4, it can be understood that when there is no external force being exerted on the support plates 15, 15' of the conical shell grasping/retaining apparatus 5, the natural spring force of the retaining clips 30 will maintain the apparatus in a closed, or gripping, state (i.e., each support plate will be biased inward). Hence, when it is desired to place the apparatus 5 in an open, or release, state, each support 15, 15' plate must be forced outward against the spring force of the retaining clips 30. This can be accomplished by contacting the activating pins 50 with the cams located along the conveyor. More specifically, by locating a cam to contact an inward face of the each of the pins 50, an outwardly-directed force will be exerted on the support plates 15, 15' of each apparatus 5 as it passes the cams. This outwardly-directed force is sufficient to produce an outward displacement of each support plate 15, 15', overcoming the spring force of the retaining clips 30 and causing the open ends 30b thereof to expand as they contact the actuator pairs 45 mounted to the support plates. Expansion of the open ends 30b of the retaining clips 30 results in an outward movement of opposed arms 35, 35' thereof, causing the apparatus 5 to be placed in a state wherein conical shells may be inserted thereto, or removed therefrom.

It should be realized that displacement of the support plates 15, 15' can occur by a means other than that of frame-mounted cams. For example, moveable cylinders, solenoids, and other similar type devices may be used to form actuators capable of causing displacement of the support plates 15, 15' when desired. Such actuators may be attached to a framework or another suitable structure at any location along the length of the conveyor. It should also be realized that it is possible to attach a moving actuator to the support plates 15, 15', whereby extension of the actuator against a framework or some other fixed structure will cause an outward displacement of the support plates. It is further contemplated that, whether using cams or moveable actuators, the devices could be designed to allow for easy relocation along the length of the conveyor 100. In this manner, additional flexibility is imparted to the manufacturing process employing the conveyor, because conical shell removal may be caused to occur at a wide variety of conveyor positions.

As can be observed by reference to FIGS. 6 and 7, the conical shell grasping/retaining apparatus 5 can be used to retain conical shells 60 even in an inverted position. In the particular manufacturing systems shown, the conical shells 60 are inverted while traveling along the bottom portion of the conveyor 100. However, the apparatus 5 may also be used with other transport mechanisms, such as, for example, with pick-and-place type robotic transfer devices. In such a case, a robot could be adapted to move a plurality of the apparatuses 5 from one location to another, and in an upright or inverted position.

The ability of the conical shell grasping/retaining apparatus 5 to maintain a conical shell in an upright position can be advantageous to a manufacturing process, particularly to a frozen cone confection manufacturing process. More particularly, there may be manufacturing steps that are best accomplished with the conical shells in an inverted position. For example, performing rim dipping and cone coating during a frozen cone confection manufacturing process is best accomplished with the conical confection shells in an inverted position. Such will become more obvious upon a reading of the following disclosure, which describes in more detail a modular and reconfigurable frozen cone confection manufacturing system, said being yet another aspect of the present invention.

Another aspect of the present invention involves providing a modular and reconfigurable manufacturing system by which frozen cone confections and the like can be produced. The modular and reconfigurable manufacturing system of the present invention and its method of use allows for greater flexibility in the design and manufacture of frozen cone confections. The modular and reconfigurable frozen cone confection manufacturing system of the present invention permits flexibility in terms of the number and type of coating, filling or topping components used, the precise point in the manufacturing process when coating, filling or topping is initiated, and the time between successive process steps. The modular and reconfigurable frozen cone confection manufacturing system and its method of use makes use of individual manufacturing stations, or assemblies, each of which are tasked with performing a particular manufacturing process step, or steps. Each manufacturing station may be interconnected or otherwise placed in communication with other manufacturing stations involved in the overall frozen confection manufacturing process. Each station or an assembly of multiple stations can be automatically relocated to various points along a manufacturing line—depending on the specific characteristics of the particular product being manufactured.

Figure 8:
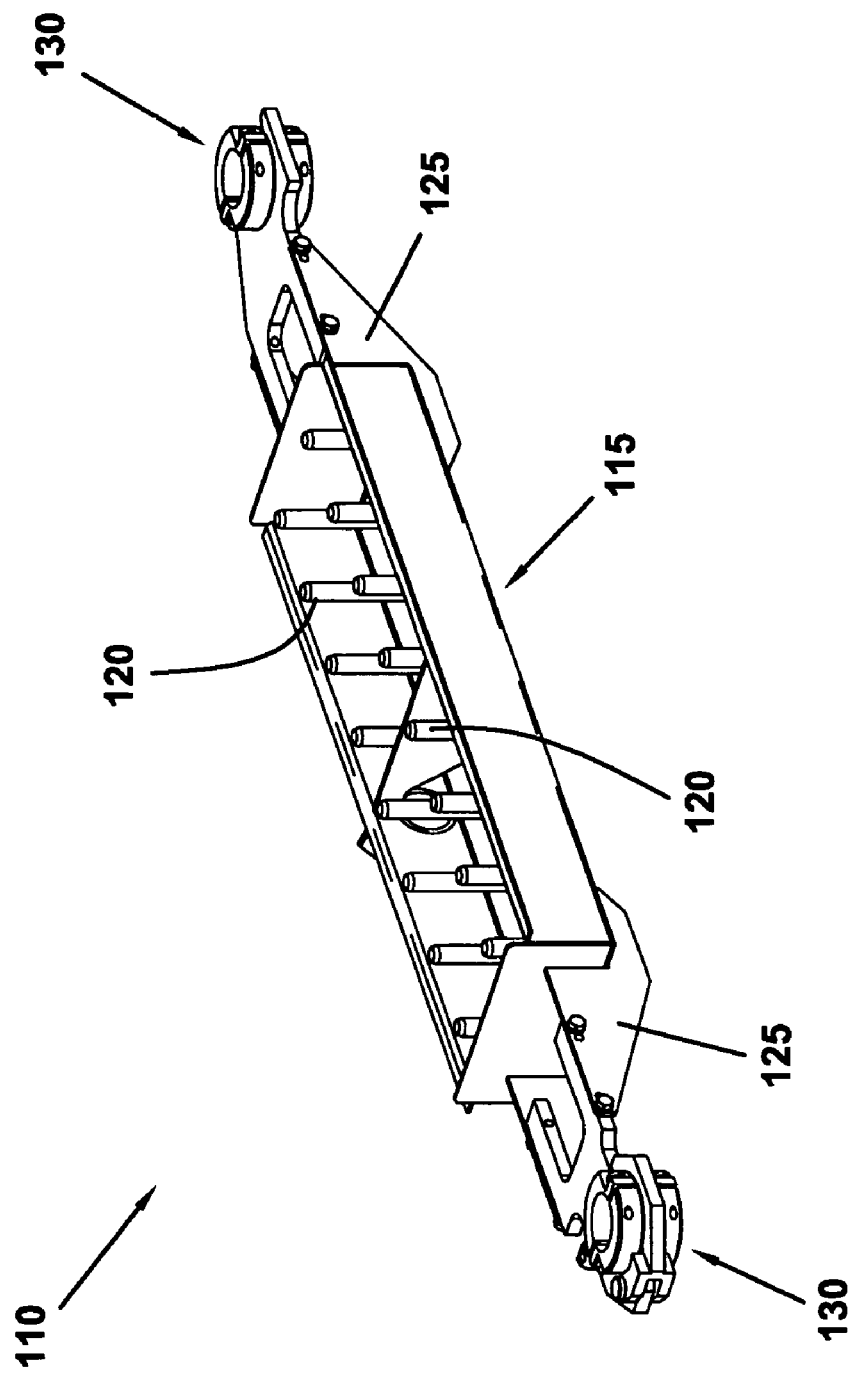
FIG. 8 is a perspective view of a dip ladle assembly portion of a rim dipping station designed to apply a coating material to the edge of a plurality of inverted conical shells in accordance with one embodiment of the present invention.

For example, the aforementioned inverted rim dipping and cone coating processes may be performed by manufacturing stations that are part of the modular and reconfigurable frozen cone confection manufacturing system and method of the present invention. These processes, and use of the modular and reconfigurable frozen cone confection manufacturing system of the present invention to perform them, can be best understood by reference to FIGS. 8-10. FIG. 8 illustrates one embodiment of a rim dip ladle assembly 110 that can be used in conjunction with the conical shell grasping/retaining apparatus 5 and modular and reconfigurable frozen cone confection manufacturing system and method of the present invention to apply a coating to the open end edge of a conical shell, while the conical shell is in an inverted position. For example, when the conical shell is a cone for a frozen cone confection, the rim dip ladle assembly 110 can be used to coat the rim of the cone with chocolate or some other confectionary coating. This is accomplished by locating the rim dip ladle assembly 110 in a manner that allows it to contact the inverted cone edge. To this end, the rim dip ladle assembly 110 is but one portion of a rim dipping manufacturing station 110' (see FIGS. 8, 10, and 15-16). In this particular embodiment, the rim dip ladle assembly 110 is adapted to be located beneath the lower portion of a conveyor, such as the conveyor 100 shown in FIGS. 6 and 7. As the inverted cones pass overhead, the rim dip ladle assembly 110 is repeatedly raised and lowered to bring the cone edges into contact with the confectionary coating residing therein. As shown in FIG. 8, the rim dip ladle assembly 110 includes a dip ladle 115 and associated supporting structure 125. The dip ladle 115 is shown to include a plurality of cone guides 120 to help ensure that the cones properly contact the contents of the ladle. The supporting structure 125 has a connecting means 130 that is designed for connection to an actuating unit assembly (described in more detail later) that acts to raise and lower the dip ladle 115 as necessary to contact its contents with the edges of the cones passing overhead. The actuating unit assembly may also be adapted to automatically relocate the rim dip ladle assembly 110 to various points along the length of a conveyor. A remote supply of coating material (such as chocolate) may be connected to the dip ladle 115. The amount of material in the dip ladle 115 may be monitored and new material may be automatically supplied thereto as needed.

Figure 9:
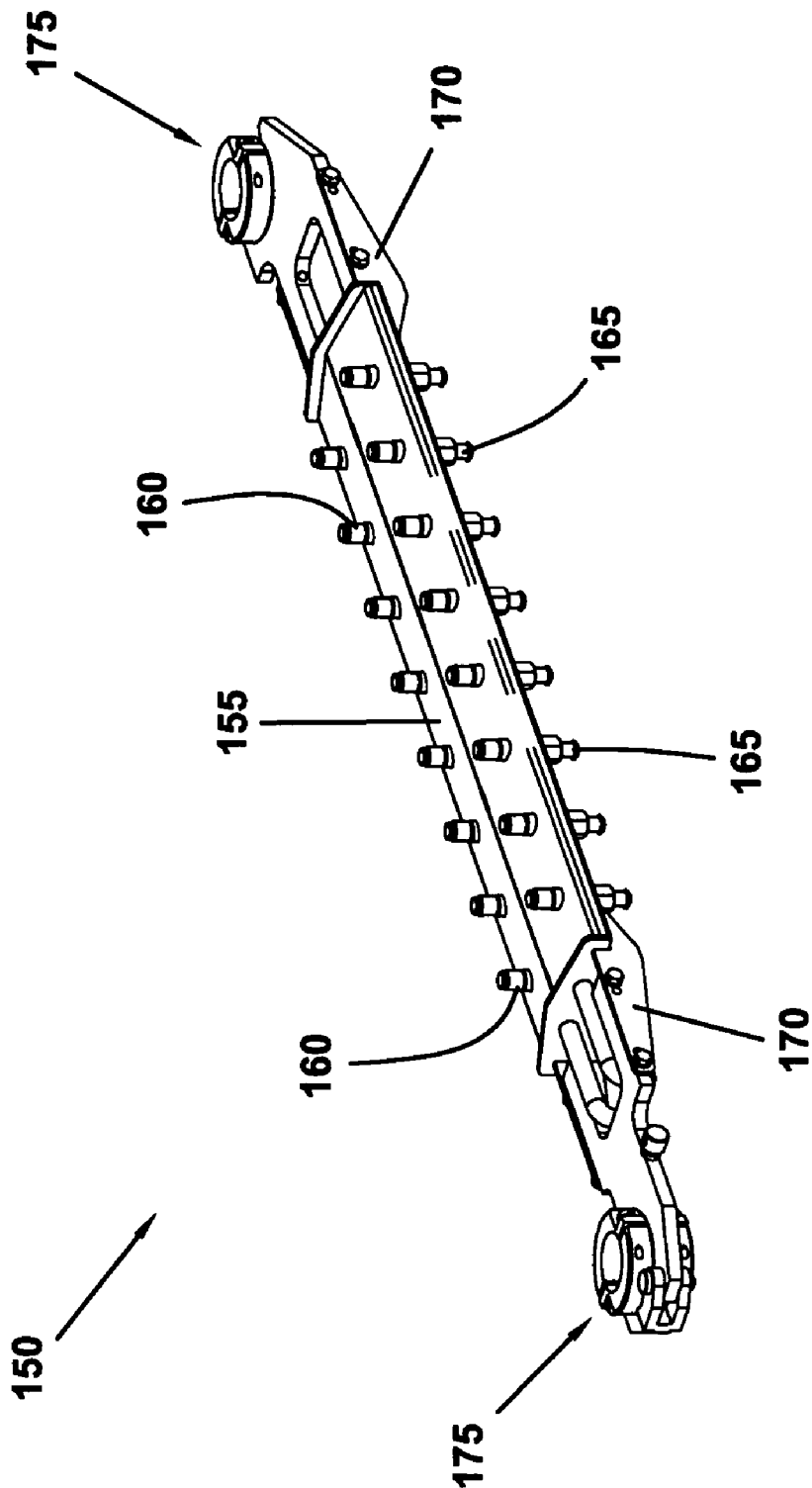
FIG. 9 is a perspective view of a spray nozzle manifold assembly portion of a cone coating station designed to apply a coating material to the interior of a plurality of inverted conical shells in accordance with one embodiment of the present invention.

FIG. 9 is a perspective view of a cone spraying nozzle assembly 150 that may be used in accordance with one embodiment of the modular and reconfigurable frozen cone confection manufacturing system and method of the present invention to spray coat the interior of a plurality of conical shells with a desired material. As with the rim dip ladle assembly 110 of FIG. 8, when the conical shell is a cone for a frozen cone confection, the cone spraying nozzle assembly 150 can be used to coat the interior of the cone with chocolate or some other confectionary coating. As can be seen in FIG. 9, the cone spraying nozzle assembly 150 includes a spray nozzle manifold 155 to which is mounted a plurality of spray nozzles 160. The spray nozzles 160 are adapted to direct a supply of coating material into the interior of a plurality of conical shells. Each of the spray nozzles 160 may be supplied with a coating material through liquid conduits (not shown), in accordance with know arrangements and materials. In this particular embodiment, quick connect/disconnect-type fittings 165 are provided for this purpose—although a multitude of other suitable connectors are also available. The spray nozzle manifold 155 is affixed to a supporting structure 170 that is designed for connection to an actuating unit assembly (described in more detail later) via a connecting means 175. The actuating unit assembly may be adapted to raise and lower the cone spraying nozzle assembly 150 as necessary to properly direct the coating material into the interior of the conical shells. Other cone spraying assembly designs may also be used of this purpose. For example, different numbers of spray nozzles may be provided. A control system may also be provided that limits operation to only particular ones of the spray nozzles, as desired by an operator. Such a control system may operate automatically, for example, when a number of cones that is less than the number of spray nozzles is detected by a sensor(s) or the like. The cone spraying assembly 150 is one portion of a cone spraying manufacturing station 150' (see FIGS. 9, 10 and 15-16).

Figure 10:
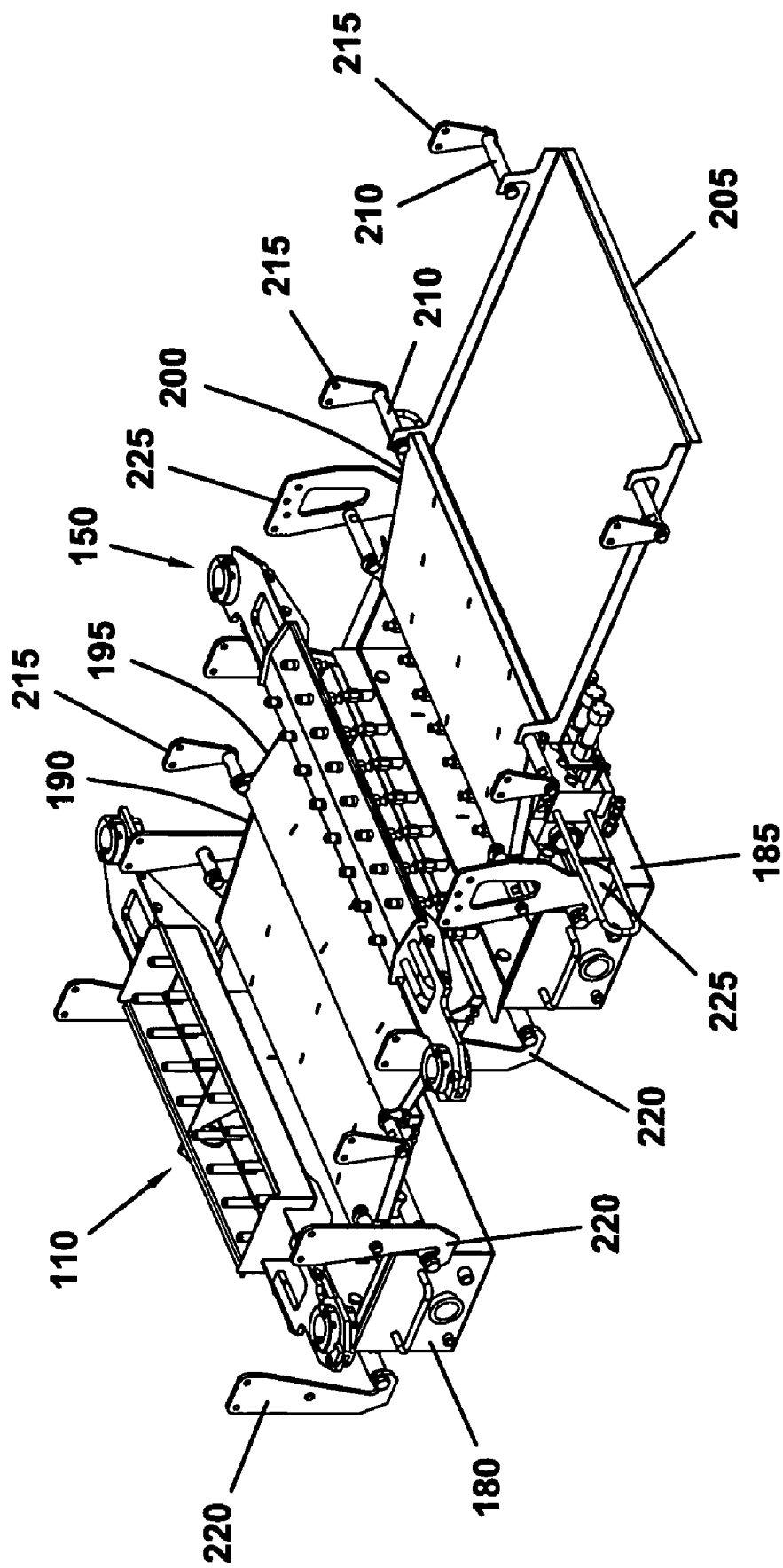
FIG. 10 shows an assembled arrangement of the dip ladle assembly and spray nozzle manifold of FIGS. 8 and 9, along with other ancillary components.
Figure 16:
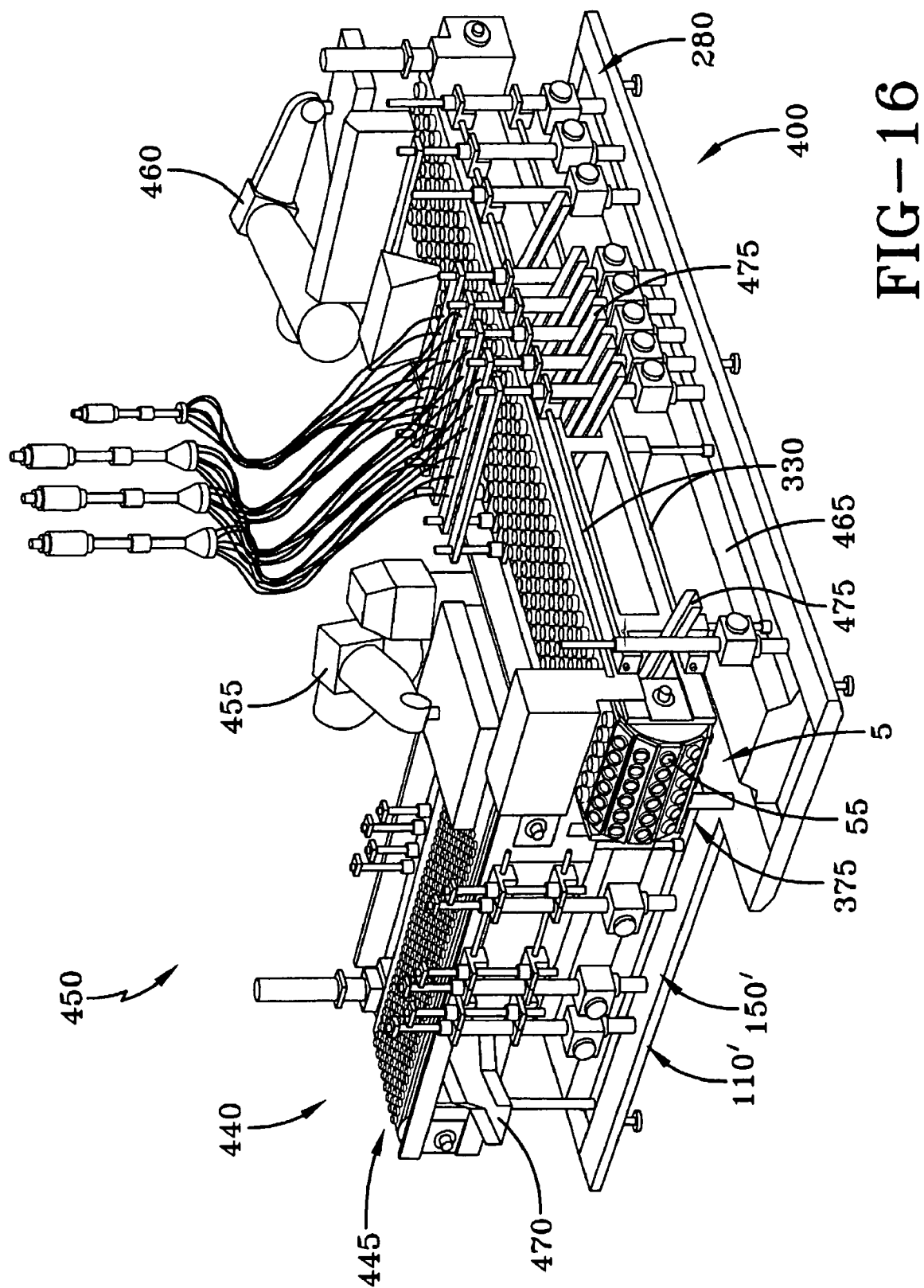
FIG. 16 is a perspective view showing the frozen cone confection manufacturing line of FIG. 15 forming part of a larger frozen cone confection manufacturing system.
Figure 17:
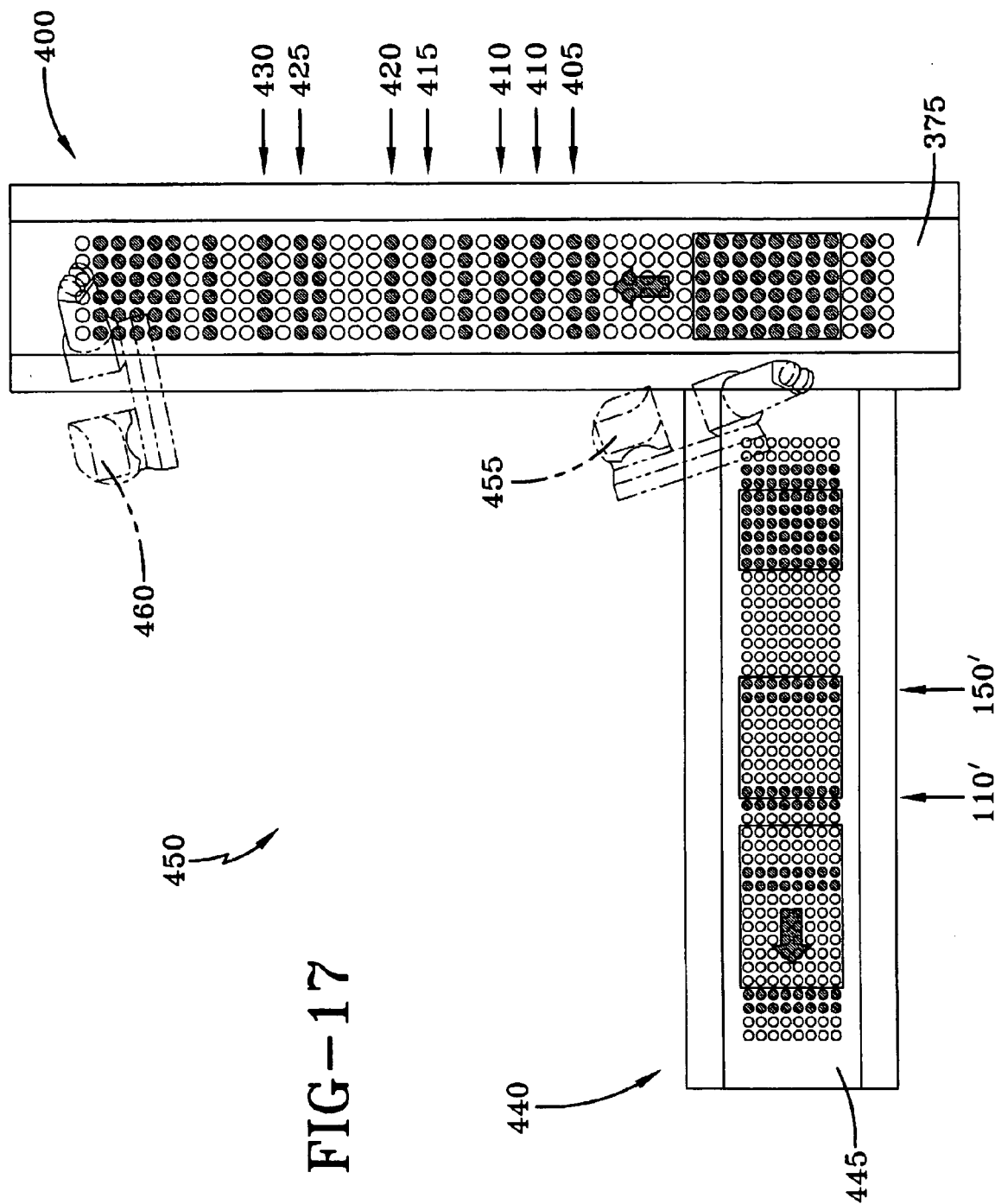
FIG. 17 is a top plan view of the frozen cone confection manufacturing system of FIG. 16, detailing the specific manufacturing steps that are performed thereby.

In FIG. 10, it can be observed that the rim dip ladle and spray nozzle assemblies 110, 150 of FIGS. 8 and 9 can be combined with other components to form a portion of a rim dip station 110' and a cone spraying station 150', respectively (see FIGS. 7, and 16-17). In FIG. 10, the rim dip assembly 110 and cone spraying assembly 150 are arranged in a position for installation to a conveyor, such as the conveyor 100 depicted in FIGS. 6 and 7. As FIG. 10 shows, the rim dipping assembly 110 and cone spraying assembly 150 may also include components such as an overflow tank 180 and spray tank 185, respectively. The overflow tank 180 can be provided to contain excess material used in the rim dipping process. The spray tank 185 can be provided to monitor and control the temperature of the ingredients of the rim dip process. As can be observed, the rim dipping assembly 110 and cone spraying assembly 150 may be provided with a series of drip trays/pans 190, 195, 200, 205 that further act to contain excess material that may fall from the conical shells during or after the rim dipping and/or cone spraying operations. In a non-reconfigurable version of the present invention, a variety of support rods 210 and hangers 215 may be provided to connect the drip trays/pans 190, 195, 200, 205 to a conveyor frame or to a similar support structure. Various hangers 220, 225 may also be provided to support the overflow tank 180 and spray tank 185, respectively. The overflow tank 180, spray tank 185, and a number of the hangers 220, 225 of a non-reconfigurable embodiment of the rim dipping and cone coating stations 110', 150' of the present invention can be seen located beneath the bottom portion of the conveyor in FIG. 7.

When used in a modular and reconfigurable frozen cone confection manufacturing system of the present invention, each of the rim dipping assembly 110 and the cone spraying assembly 150 is adapted to be displaceable along the length of a conveyor. In such an embodiment, the drip trays/pans may be connected to a support structure that is also moveable. For example the drip trays/pans labeled as 190 and 195 may move along with a rim dipping station 110', while the drip trays/pans labeled as 200 and 205 may move along with a cone coating station 150'. The overflow pan 180 and spray pan 185 may move along with the rim dipping station 110' and cone coating station 150' in a similar manner.

Figure 11:
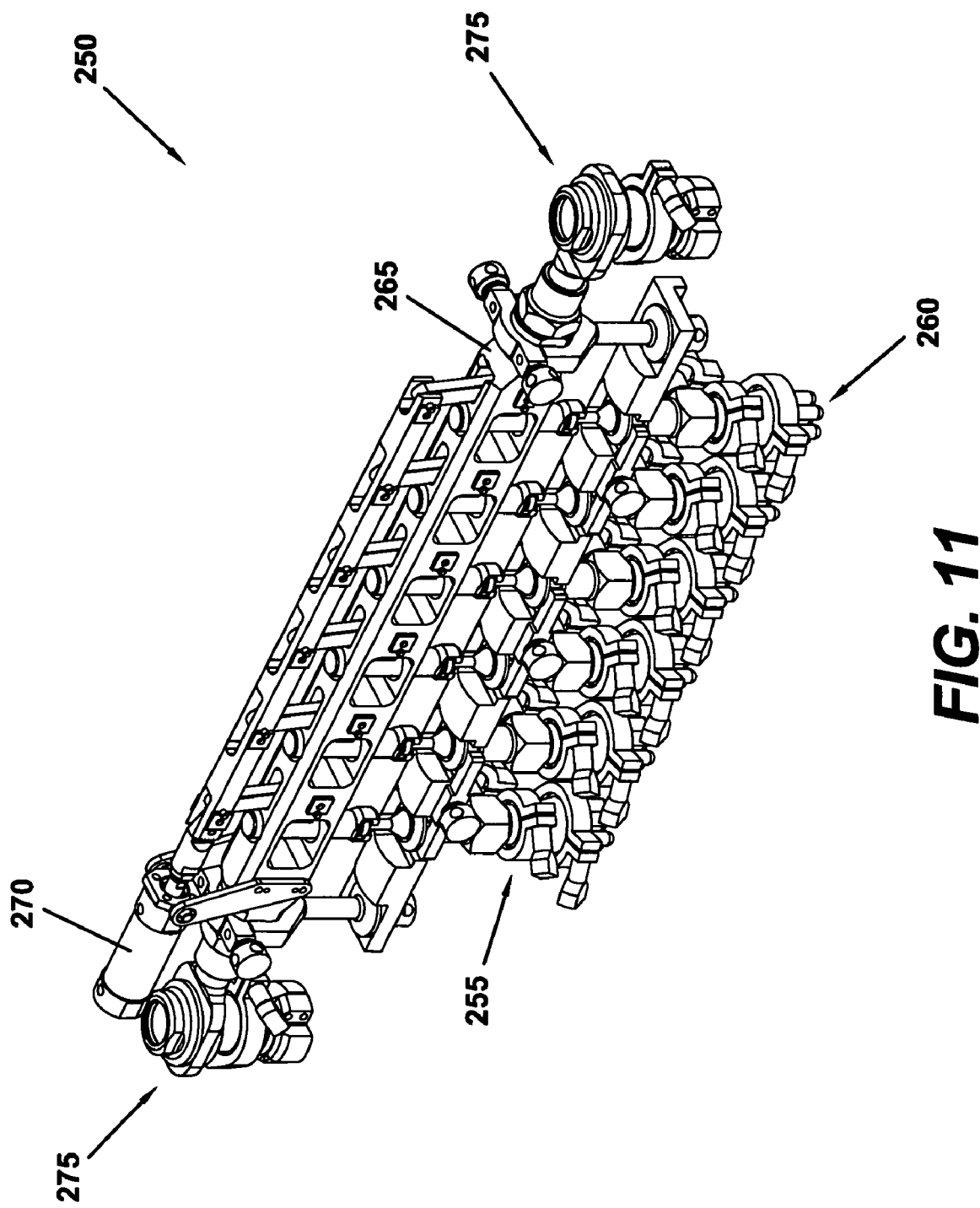
FIG. 11 illustrates one embodiment of a filler head assembly portion of a filling station designed to fill conical shells with a material in accordance with one embodiment of the present invention.

A filling station and a topping and/or coating station may also be employed by the modular and reconfigurable frozen confection manufacturing system of the present invention. One embodiment of a filler head assembly 250 for use in a filling station can be seen in FIG. 11. The filler head assembly 250 is shown to include a number of dispensing heads 255 to each of which may be attached one or more nozzles 260. A support structure 265 is provided to mount the dispensing heads and various other components, such as a flow controller 270. A connecting means 275 is affixed to the support structure 265 for coupling the filler head assembly 250 to an actuator assembly of a filling station.

Figure 18:
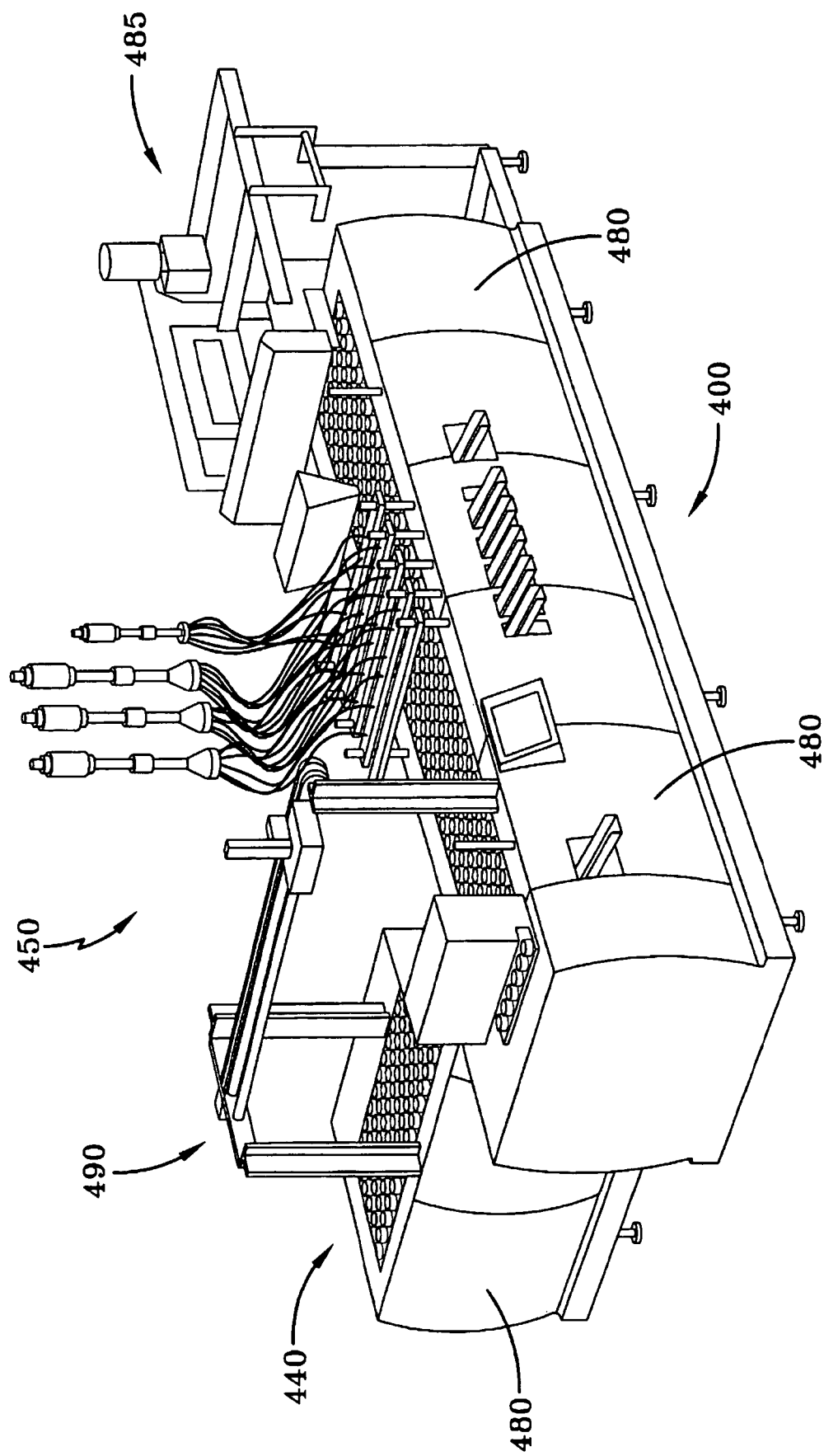
FIG. 18 depicts the frozen cone confection manufacturing system of FIG. 17 with guarding and additional packaging equipment attached thereto.

In a manner similar to that of the rim dipping station 110' and the cone spraying station 150', a modular filling station 250' may be constructed using the filler head assembly 250 and requisite other components. For example, the filling station 250' will generally be connected to a supply of one or more filling materials, such as ice cream, as can be seen in FIGS. 16 and 18. Also like each of the rim dipping station 110' and the cone spraying station 150', the filling station 250' is adapted to be displaceable along the length of a conveyor. A coating station and/or a topping station may be constructed in a similar manner. In a frozen cone confection manufacturing process, the coating station can be used to dispense a confectionary coating to an ice cream filled cone. Similarly, the topping station can be used to dispense nuts or other confectionery toppings. Like the filling station 250', each of the topping station and coating station can be connected to an appropriate supply of material.

The modularity and reconfigurability of the modular and reconfigurable frozen cone confection manufacturing system of the present invention is achieved in one exemplary embodiment by providing each manufacturing station with a support and guide system that serves to properly locate each manufacturing station with respect to a conveyor, as well as allow each manufacturing station to be accurately located at various points along the length of the conveyor. In an exemplary embodiment of the modular and reconfigurable frozen cone confection manufacturing system of the present invention, drive motors, more preferably, servo motors, are used to automatically position each manufacturing station as necessary to produce a given product. The positioning/repositioning may be accomplished manually.

Figure 12:
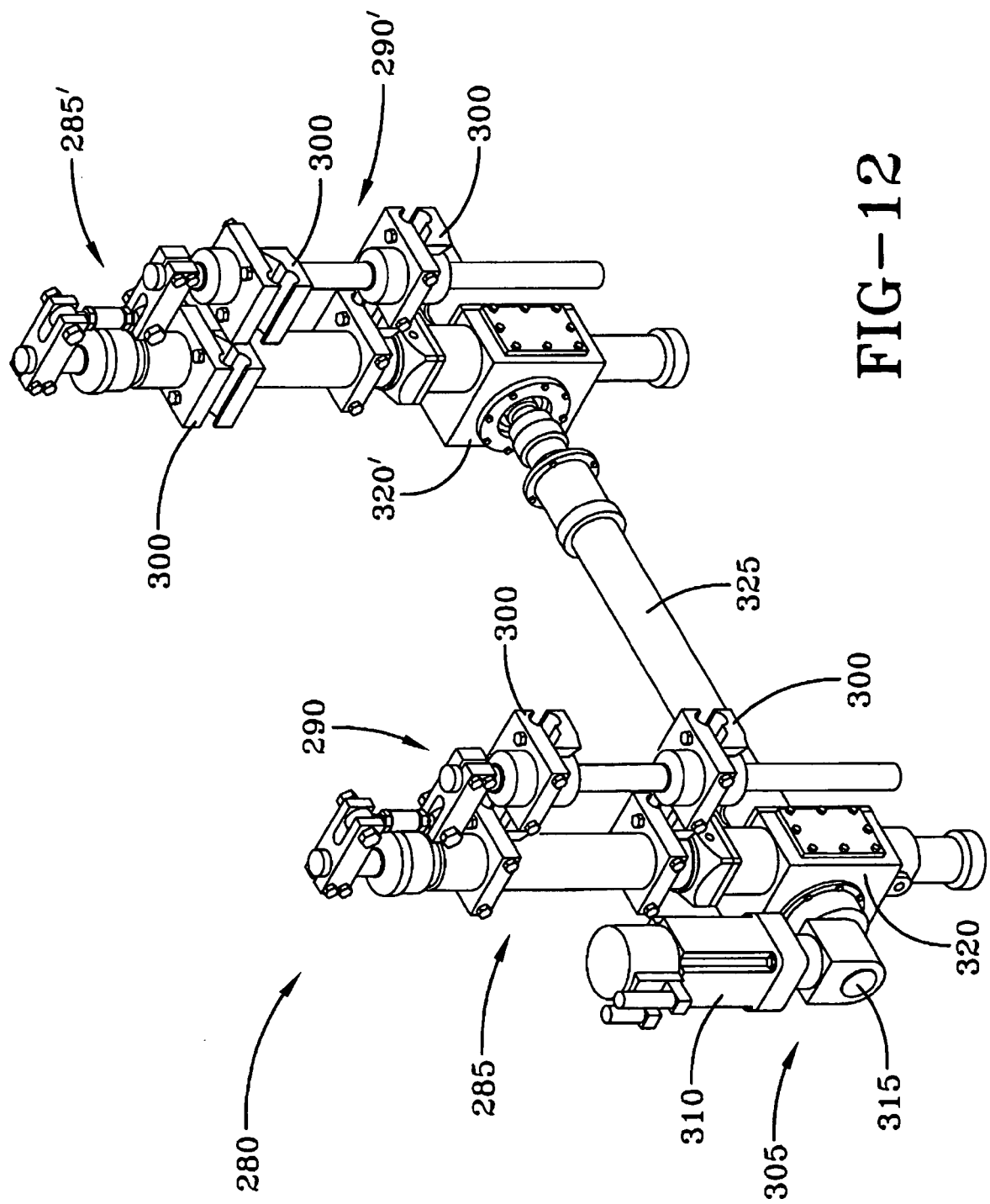
FIG. 12 is a perspective view of one embodiment of an actuating assembly that can be used to manipulate various manufacturing stations of the present invention.

An exemplary embodiment of an actuating unit assembly 280 as described above, can be seen in FIG. 12. As can be observed in FIG. 12, this embodiment of the actuating unit assembly 280 includes a corresponding pair of vertical supports 285, 285' that are designed to reside on opposite sides of a conveyor (not shown for purposes of clarity). In this particular embodiment, each of the vertical supports 285, 285' is associated with an assisting support 290, 290'. The use of assisting supports 290, 290' is optional, but may be beneficial when heavier or larger manufacturing station components will be attached to the vertical supports 285, 285'. Each of the vertical supports 285, 285' and assisting supports 290, 290' is shown to have a guide clamp 300 affixed thereto.

The guide clamps 300 are provided to engage with guide rails/rods 330 (see FIGS. 13-16) that are attached to, or near, the conveyor 375 with which the manufacturing stations are associated. The guide clamps 300 serve to both direct the movement of the manufacturing stations along the length of the conveyor, as well as to secure the position of each manufacturing station along the length of the conveyor. The guide clamps 300 may be caused to exert a gripping force on the guide rails/rods 330 by numerous means. For example, a fastener(s) may be used to draw two halves of the guide clamps 300 together, or an actuator may be used to pivot one guide half toward the other. Many other means and methods of accomplishing this function would be apparent to one skilled in the art. Consequently, the design and construction of the guide clamps is not limited to that shown. Additionally, it is also contemplated that guides may be provided on the actuating unit assembly 280 only to direct movement of the manufacturing stations along the length of the conveyor, while securing the position of each manufacturing station with respect to the conveyor can be accomplished by one or more other devices that are unrelated to the guides.

The actuating unit assembly 280 is also shown to include a vertical lift unit 305 that, in this particular embodiment, is comprised of the vertical supports 285, 285', a drive motor 310, optional speed reducer 315, gear boxes 320, 320', and connecting shaft 325. Preferably, the drive motor 310 is a servo motor. The vertical lift unit 305 is employed to provide a vertical displacement of various manufacturing station components, such as the aforementioned rim dipping and cone coating assemblies 110, 150. Such components may be affixed to the vertical supports 285, 285' by the connecting means 130, 175 portion of their support structure 125, 170.

The drive motor 310 is used to drive the gear boxes 320, 320' which, in turn, are adapted to engage a portion of their respective vertical supports 285, 285', thereby causing the height of each vertical support to be increased or decreased by some amount. In this manner, a component, or components, of the manufacturing station with which the actuating unit assembly 280 is associated, may be raised or lowered as needed to perform a particular manufacturing process step, or steps. For example, an actuating unit assembly 280 may be used to raise and lower each of the above-described rim dipping assembly 110, cone coating assembly 150, and filler head assembly 250. An actuating unit assembly 280, in conjunction with each of the rim dipping assembly 110, cone coating assembly 150, filler head assembly 250 and related ancillary components, form the rim dipping station 110', cone coating station 150', and filling station 250', respectively.

In another embodiment of the present invention, a separate drive system (not shown) may be included on the actuating unit 280 to provide for automatic movement of each manufacturing station along the length of a conveyor. Preferably, one or more guide rails/rods 330 are provided to control the direction of movement of the manufacturing stations as they are moved along the conveyor. The drive system may be comprised of, for example, a drive motor that engages a gear rack or the guide rails/rods 330. In such a case, the drive motor is preferably a servo motor, which provides for accurate positioning. Alternatively, the drive system may employ pneumatic or hydraulic cylinders or other similar actuators to move the manufacturing stations along the length of the conveyor. When a drive system is provided that employs a drive means other than a servo motor, some means of position detection is preferably also provided, such as a limit switch, proximity switch, encoder, or other known devices.

Figure 14:
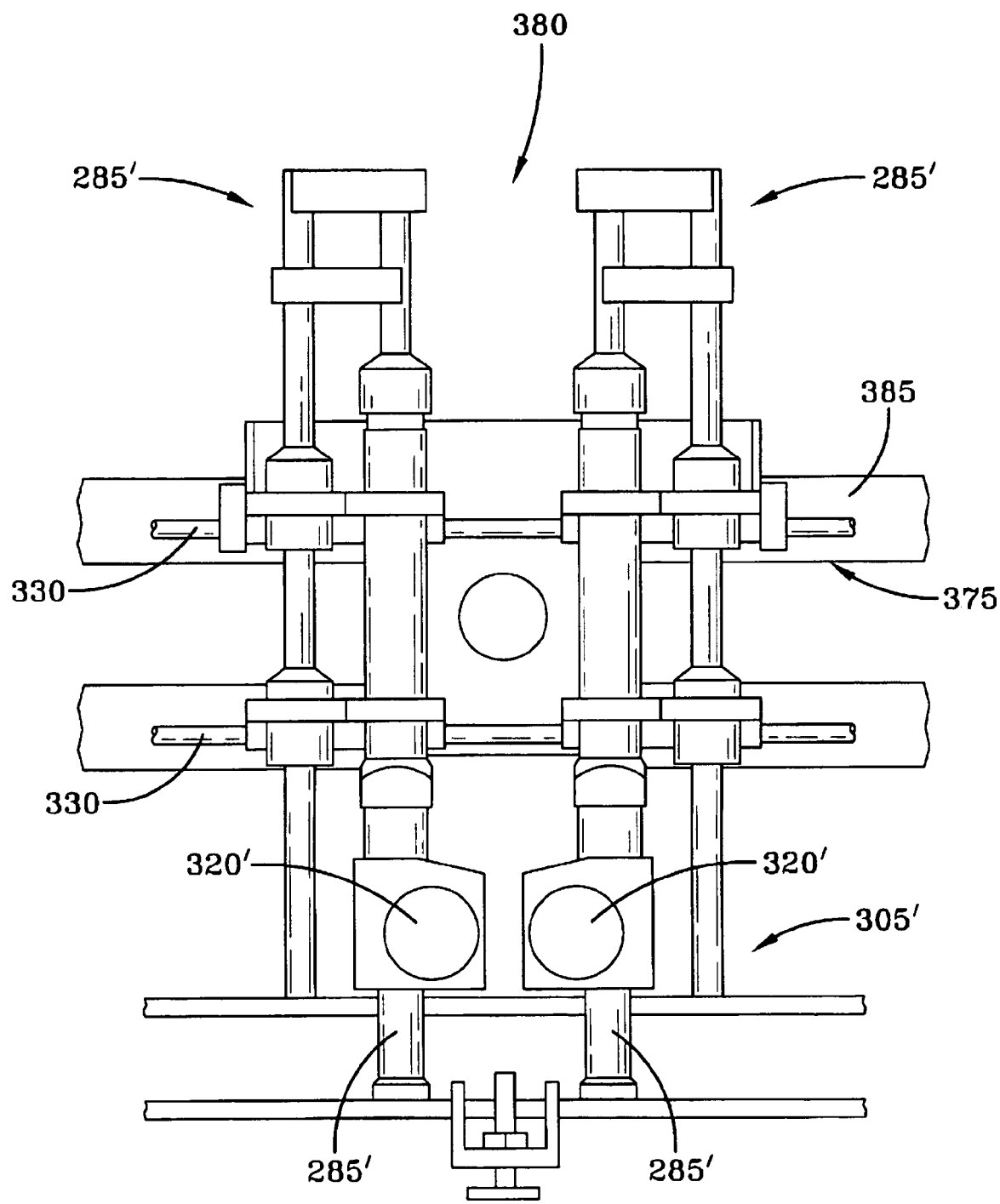
FIG. 14 is an enlarged end view of one embodiment of an actuating assembly pair of the present invention, coupled to a single manufacturing station and installed to a conveyor.
Figure 15:
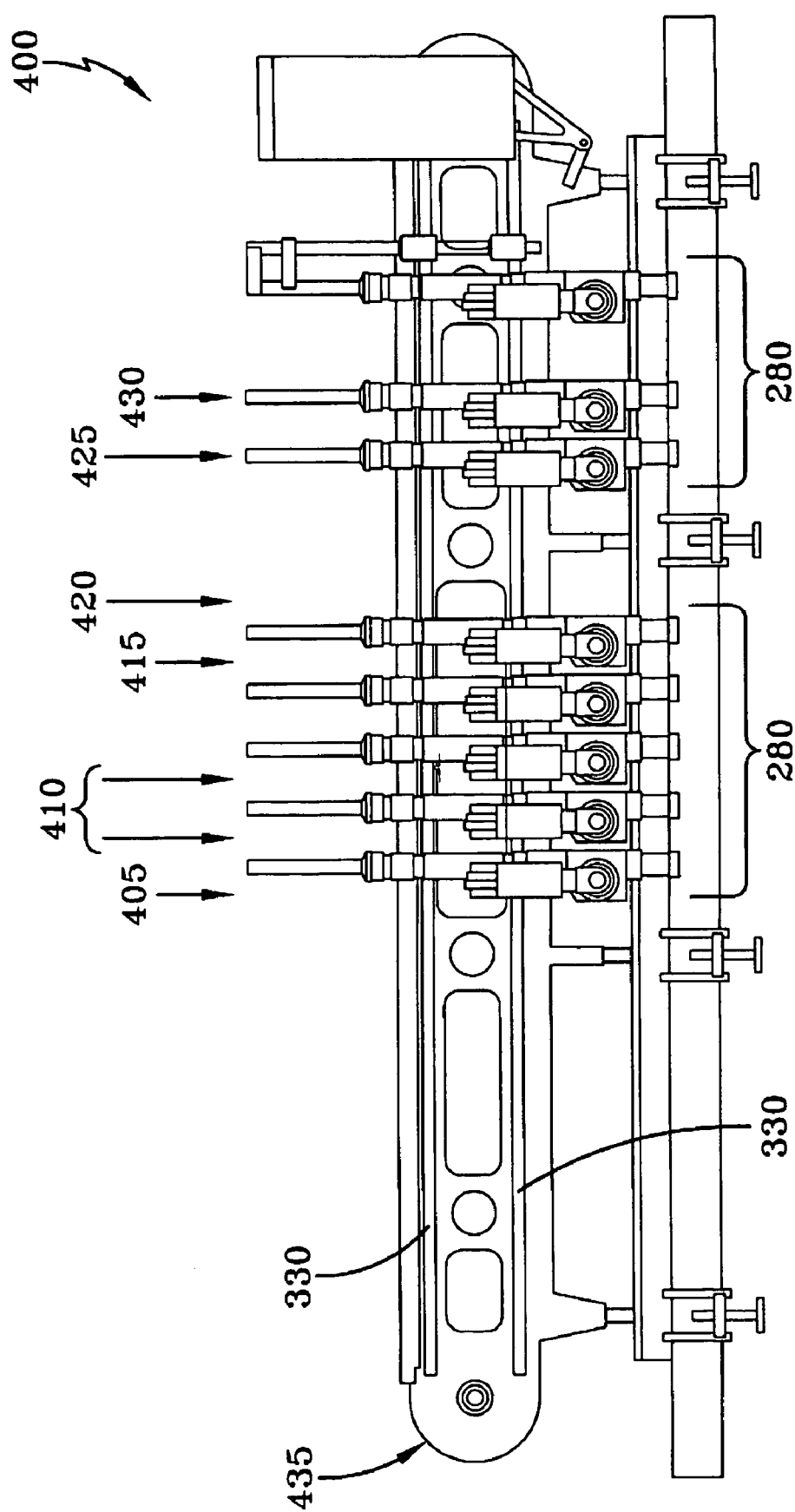
FIG. 15 is a side elevational view of a portion of one embodiment of a frozen cone confection manufacturing line of the present invention, wherein a plurality of the actuating assemblies of FIGS. 12-14 are shown to be installed to a conveyor.

Various manufacturing stations can be observed to be displaceably associated with a conveyor 375 in FIGS. 14-16. In FIG. 14, an enlarged end view of a pair actuating unit assemblies 280 that are associated with the conveyor 375 is presented. In this particular example, both of the actuating assemblies 280 are associated with a single manufacturing station 380, which multi-actuating assembly association is another feature of the present invention. In other embodiments of the present invention, such as the embodiment of FIGS. 15 and 16, each actuating unit may be associated with a single manufacturing station.

In the embodiment of FIG. 14, the manufacturing station 380 can be seen to perform a process above the top portion 385 of the conveyor 375 (i.e., while the conical shells are in an upright position). For example, when used in a frozen cone confection manufacturing process, the manufacturing station 380 could fill, coat, or top the cones, or could dispense or crimp package lids.

FIGS. 15 and 16 illustrates how a plurality of manufacturing stations 405, 410, 415, 420, 425, 430, can be located along the length of a conveyor 435 in order to produce the desired product. In this particular embodiment of the present invention, a modular and reconfigurable frozen cone confection manufacturing line 400 and process is depicted. As can be seen, various process steps associated therewith can be performed across the length of the conveyor 435. In this particular embodiment, sleeves (not shown) are dispensed into the various conical shell receptacles 55 of a plurality of the conical shell grasping/retaining apparatuses 5 described previously, as each apparatus moves around a first end of the conveyor 435 and onto a top portion thereof. Other conical shell grasping/retaining means could also be employed, and this aspect of the present invention is not limited to use with the conical shell grasping/retaining apparatuses 5 shown. Once a predetermined number of sleeves have been loaded into the appropriate number of apparatuses 5, a plurality of conical shells (not shown) may be loaded thereto. In this particular embodiment of the modular and reconfigurable frozen cone confection manufacturing line 400, a robot is used to load the conical shells to the apparatuses 5. Other known means of loading conical shells to the apparatuses 5 may also be used, and such is within the scope of the present invention.

Once the conical shells have been loaded to the apparatuses 5, the apparatuses proceed toward the first of the frozen cone confection manufacturing stations. In this particular embodiment of the modular and reconfigurable frozen cone confection manufacturing line 400, the first manufacturing station is a chocolate plug or spray station 405, which is provided to coat the inside of the conical shells with chocolate. When a spray coating is applied, the vertical lift unit of the chocolate plug or spray station's 405 actuating assembly 280 preferably acts to locate the spray nozzles thereof in an appropriate vertical position to best spray the inside of the cones passing therebeneath. In another embodiment of the present invention, the process steps and manufacturing stations of the modular and reconfigurable frozen cone confection manufacturing system could be arranged such that the first manufacturing station(s) encountered is the rim dipping and/or cone coating stations 110', 150' previously described. In such a case, loading of the sleeves and conical shells may occur on the opposite end of the conveyor, for example, such that the dipping and or spraying of the conical shells can occur while the conical shells are inverted (see FIG. 7).

The next manufacturing station shown in the example of FIGS. 15 and 16 is a filling station 410, such as the previously-described filling station 250' that makes use of filler head assembly 250. Of course, other filling station designs are also possible. When used in a frozen cone confection manufacturing process, the filling station is used to fill the conical shells with ice cream or other frozen foodstuffs. In this particular embodiment of the modular and reconfigurable frozen cone confection manufacturing line 400, two separate filling stations 410 are used to accomplish the filling process. The use of two filling stations 410 may allow different materials to be added to the conical shells or may allow the creation of complex filling shapes, for example. As with the other manufacturing stations, the filling stations 410 are preferably adapted to be relocated to different points along the length of the conveyor 435. The filling stations are also preferably provided with a vertical lift assembly 305, as described above, so that the filling heads, or other nozzles or dispensing devices, can be properly located with respect to the conical shells passing beneath. At least with respect to a frozen cone confection manufacturing process, the filling stations 410 are also preferably operative for vertical displacement while the filling operation is ongoing.

Additional manufacturing stations may also be provided, as can be seen in FIGS. 15 and 16. In the particular embodiment of the modular and reconfigurable frozen cone confection manufacturing line 400 shown, a wet topping station 415, a dry topping station 420, and lid dispensing and crimping stations 425, 430 are depicted. Therefore, as can be understood, virtually any number and manner of manufacturing stations may be employed as necessary to produce a given product. It can also be understood, particularly by reference to FIGS. 15 and 16 in light of the foregoing description, that a modular and reconfigurable frozen cone confection manufacturing line of the present invention, such as manufacturing line 400, allows for a very flexible manufacturing operation. For example, when the particular frozen cone confection manufacturing process performed by the system of FIGS. 15 and 16 is considered, it should be realized that the manufacturing stations 405, 410, 415, 420, 425, 430 thereof must be set apart by some substantially specific and predetermined distance. Particularly, some dwell time must occur in between the cone dipping and/or coating process that occurs at the first, chocolate plug/spray, manufacturing station 405, and the subsequent filling station(s) 410. Such a dwell time is required to allow the chocolate or other coating material to set up before a filling material, such as ice cream, is introduced to the conical shells. Similarly, a particular dwell time must exist between the filling station(s) 410 and the wet topping station 415, in order to ensure that the wet topping, which is often applied at an elevated temperature, does not cause excessive melting of the frozen filling material, such as an ice cream filling material. The same is true with respect to the following manufacturing stations. For example, the dry topping material should preferably be applied to the frozen cone confection when the wet topping material is still in a somewhat liquid state, as if the wet topping material is allowed to solidify, the dry topping material likely will not stick thereto. Consequently, some predetermined dwell time is necessary between the wet topping station 415 and the dry topping station 420. A predetermined dwell time is also preferably caused to exist between the last of the manufacturing stations and the first of the packaging stations, such as, for example, the lid dispensing and crimping stations 425, 430 shown. In this manner, it can be ensured that the frozen cone confections will be in a state wherein damage thereto from contact with packaging materials is least likely. For example, in the particular frozen cone confection manufacturing process described herein, it would be desirable to allow the wet topping to substantially solidify and the dry topping material to be secured thereby prior to subjecting the frozen cone confections to a packaging operation.

When producing a single product (or products having substantially identical manufacturing parameters) it is possible to design a manufacturing line having the necessary equipment location and, hence, the necessary dwell times. However, such manufacturing lines and their equipment are not amenable to the manufacturing of products having dissimilar manufacturing parameters. If an additional manufacturing step must be added, or different dwell times are required between manufacturing process steps, it may be difficult (not to mention cost prohibitive), if not impossible, to modify an existing manufacturing line. For example, in a frozen cone confection manufacturing process, it could be very difficult to add a second filling or topping step, as equipment related to preceding or subsequent process steps would typically be fixed in position. Therefore, aside from the general problem of finding room to install the additional equipment, it is unlikely that the dwell times between process steps would thereafter remain acceptable.

Therefore, the advantages to utilizing an adaptive manufacturing line, such as the above-described modular and reconfigurable frozen cone confection manufacturing line 400, are quite clear. The manufacturing stations of such a line may generally be moved to substantially any point along the length of a conveyor or other device provided to move the product being manufactured from one manufacturing step to the next. A conveyor of extra length may be used, if desired, to allow for the addition of a number of initially nonexistent manufacturing stations, or the use of a number of initially unused manufacturing stations. Space may be created between manufacturing stations by displacing the manufacturing stations along the length of the conveyor as needed. In this manner, additional manufacturing stations can be installed, and dwell timed between manufacturing steps can be adjusted as needed.

FIG. 16 illustrates how more than one modular manufacturing line may be employed to form a larger and more complex overall modular and reconfigurable frozen cone confection manufacturing system 450. In this particular embodiment of such a system 450, the modular and reconfigurable frozen cone confection manufacturing line 400 shown in detail in FIG. 15, has been combined with a second modular and reconfigurable frozen cone confection manufacturing line 440. An overhead schematic diagram detailing the operations performed by the system 450 of FIG. 16 can be observed in FIG. 17. As can be seen, the first modular and reconfigurable frozen cone confection manufacturing line 400 performs the process steps described above with reference to FIG. 15. The second modular and reconfigurable frozen cone confection manufacturing line 440 is shown to perform additional manufacturing steps that must precede those performed by the first manufacturing line 400. For example, modular and reconfigurable manufacturing stations, such as a rim dipping station 110' and a cone coating station 150', may be included on the second manufacturing line 440. The manufacturing stations may operate in a similar manner to those described above. In this particular embodiment of the modular and reconfigurable frozen cone confection manufacturing system 450, the conveyor 375 of the first modular and reconfigurable frozen cone confection manufacturing line 400 is shown to be at a substantially right angle to the conveyor 445 of the second modular and reconfigurable frozen cone confection manufacturing line 440. It should be realized, however, that this is merely an exemplary embodiment of such a system 450, and nothing herein is intended to limit the configuration of such a system to that shown.

The modular and reconfigurable frozen cone confection manufacturing system 450 shown in FIGS. 16 and 17 also illustrates how other equipment may be integrated into the manufacturing process. For example, the system 450 is shown to employ both a conical shell loading robot 455 and a frozen cone confection unloading robot 460 to assist in the manufacturing process. Various attachments and other ancillary devices may be associated with each of the robots 455, 460 for completing the particular manufacturing steps with which each is tasked. A collection tray(s)/pan(s) 465 can be seen to reside near the bottom of the conveyor 375 to facilitate cleanup. Similarly, various ejection chutes 470, 475 may provided to collect and transport excess materials, broken conical shells, reject frozen cone confections, and similar other items from the manufacturing lines 400, 440 at certain locations along each conveyor 375, 445.

The modular and reconfigurable frozen cone confection manufacturing system 450 of FIGS. 16 and 17 (with robots 455, 460 removed for purposes of clarity) is shown in FIG. 18 with one form of operator guarding 480 in place. Additional packaging-related equipment 485, 490 has also been installed to the manufacturing lines 400, 440 of the modular and reconfigurable frozen cone confection manufacturing system 450 in FIG. 18.

A processor-based control system is preferably provided to control a modular and reconfigurable frozen cone confection manufacturing line, or system, of the present invention, such as the manufacturing lines 400, 440 shown in FIGS. 15-18, and/or the system 450 shown in FIGS. 16-18. Each manufacturing station of the manufacturing lines, as well as ancillary equipment, may be controlled by a centralized microprocessor. Thus, there may be a single processor-based controller for an entire modular and reconfigurable frozen cone confection manufacturing system of the present invention. Alternatively, more than one microprocessor may be used to control all of the elements of such a system. When other automated equipment having its own processor-based control(s) is utilized along with a modular and reconfigurable frozen cone confection manufacturing line or system of the present invention, the processor-based controllers may be in electronic communication. For example, in the system 450 depicted in FIGS. 16-18, the controller(s) for the robots 455, 460 may communicate with the controller(s) for the manufacturing lines 400, 440 and other related equipment to ensure that the system 450 works as a whole.

Figure 13:
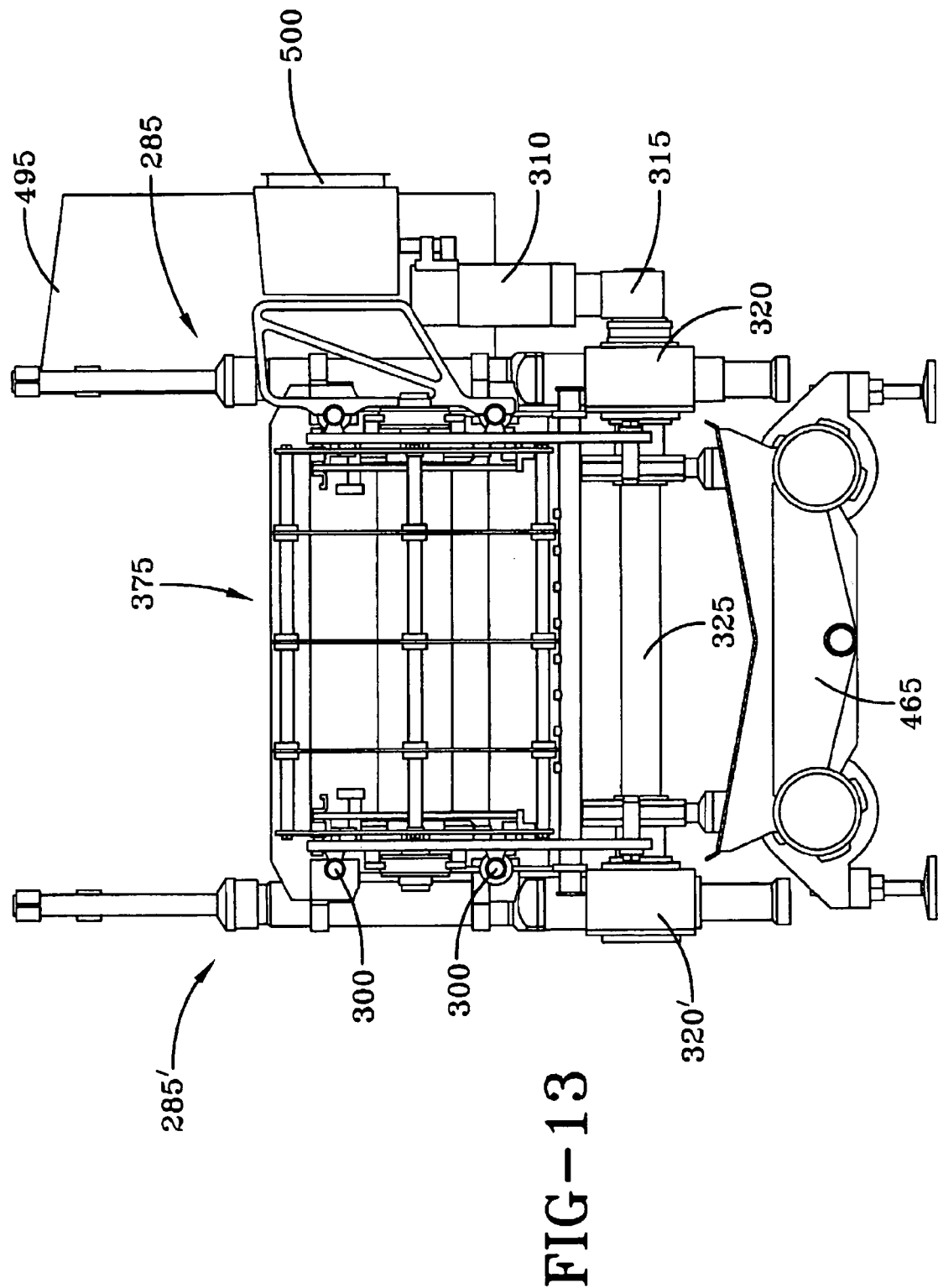
FIG. 13 is a side elevational view of the actuating assembly of FIG. 12, installed to a conveyor.

When a single controller is provided for a modular and reconfigurable frozen cone confection manufacturing system of the present invention, such may be located in a single enclosure, such as the enclosure 495 shown in FIG. 13. One or more operator's panels 500 may be included to provide information to an operator of the system. It is contemplated that one, or both, of the controller enclosure 495 and the operator's panel 500 may be adapted to move along the length of the conveyor as do the manufacturing stations. In alternate embodiments of the present invention, multiple enclosures may be provided to contain multiple processors. In yet another embodiment of the present invention, it is possible that a remotely located control system can be used to control one or more manufacturing systems. In such a case, it should be understood that process configuration/reconfiguration, monitoring, and general control, can take place from a remote location.

In one embodiment of the present invention, the processor-based control system also preferably allows the manufacturing stations to be automatically provided with parameters necessary to properly produce a particular product. Such information may be provided to the control system in a number of ways. The operator may provide positioning information with respect to the vertical movement of the manufacturing station components, such as filling heads and the like, that will be used in the manufacturing process. Alternatively, all information necessary to produce a particular product may be stored in a database or on a computer-readable medium, whereby the proper data may be provided to the control system upon selection of a particular program by an operator. Programs may be associated with numbers, names, codes, or virtually any other designator that associates a program and its data with a particular product. Program selection may be accomplished by the pressing of a button, the flipping of a switch, or by selection of an icon on a computer screen, for example. In yet another embodiment of the present invention, it is contemplated that program selection may be automatic, and initiated by detection of a particular product component.

In an automatically reconfigurable system of the present invention, an operator may have to do little more than select between programs to manufacture dissimilar products. Once a program is selected, each manufacturing system will automatically move to the correct position along the conveyor, and will also be provided with the data necessary to carry out the manufacturing step(s) for which it is responsible. Consequently, manufacturing station spacing will also be automatically set, ensuring that the dwell times necessary between manufacturing steps are correct.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, it will be within the ability of one of ordinary skill in the art to make alterations or modifications to the present invention, such as through the substitution of equivalent materials or structural arrangements, or through the use of equivalent process steps, so as to be able to practice the invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A modular and reconfigurable frozen cone confection manufacturing system, comprising:
    a plurality of conical confection shell grasping and retaining apparatuses;
    a transport mechanism for moving the plurality of conical confection shell grasping and retaining apparatuses from a first point to a second point; and
    a plurality of individual manufacturing stations, each manufacturing station adapted to perform one or more manufacturing process steps as conical confection shell grasping and retaining apparatuses containing conical confection shells pass by;
    wherein one or more of the plurality of manufacturing stations is adapted for relocation to various points along the length of the transport mechanism;
    whereby the dwell time between process steps can be adjusted by moving the appropriate manufacturing station(s); and
    whereby frozen cone confections having different manufacturing parameters can be manufactured by the same system.

2. A system according to claim 1 wherein the position of certain components of one or more of the manufacturing stations can be adjusted with respect to open ends of the conical shells.

3. A system according to claim 1 wherein the one or more manufacturing stations adapted for relocation to various points along the length of the transport mechanism are automatically relocated as needed.

4. A system according to claim 3 wherein a servo motor and drive means is provided to automatically relocate each appropriate manufacturing station.

5. A system according to claim 1 wherein one of the plurality of individual manufacturing stations is a rim dipping station that is adapted to coat an open end edge of each conical shell with a coating material while the conical shell(s) is in an inverted position.

6. A system according to claim 1 wherein one of the plurality of individual manufacturing stations is a cone coating station that is adapted to coat the interior of each conical shell with a coating material while the conical shell(s) is in an inverted position.

7. A system according to claim 1 further comprising a processor-based control system for controlling the operation of the plurality of individual manufacturing stations and the transport mechanism.

8. A system according to claim 7 wherein relocation of one or more of the plurality of individual manufacturing stations occurs automatically as a result of the control system receiving an input indicating that a particular frozen cone confection is to be manufactured.

9. A modular and reconfigurable frozen cone confection manufacturing system, comprising:
 a frozen cone confection manufacturing line having:
  a plurality of conical confection shell grasping and retaining apparatuses, each of the plurality of conical confection shell grasping and retaining apparatuses adapted to grasp and retain conical confection shells whether in an upright or inverted position;
  a means of loading conical confection shells to the plurality of conical confection shell grasping and retaining apparatuses;
  a transport mechanism for moving the plurality of conical confection shell grasping and retaining apparatuses along the length of a frozen cone confection manufacturing line;
  a plurality of relocatable manufacturing stations, each relocatable manufacturing station adapted for relocation to various points along the length of the manufacturing line and further adapted to perform one or more frozen cone confection manufacturing process steps as conical confection shell grasping and retaining apparatuses containing conical confection shells pass by, each manufacturing station comprising:
   (1) an actuating assembly, the actuating assembly further comprising:
    (a) a pair of vertical support members adapted to reside on opposite sides of the transport mechanism, and designed to support manufacturing components used to perform specific manufacturing process step(s) with which the manufacturing station is tasked,
    (b) a vertical lift unit having a drive means operative to adjust the distance of the manufacturing components from the open end of the conical shells, and
    (c) at least one guide for directing movement of the manufacturing station along the length of the manufacturing line;
   (2) manufacturing components used to perform specific manufacturing process step(s) with which the manufacturing station is tasked, and
   (3) a supply of material, or a means for connection to a supply of material, for use in the specific manufacturing process step(s) with which the manufacturing station is tasked,
  a means of unloading conical confection shells from the plurality of conical confection shell grasping and retaining apparatuses; and
  a processor-based control system for providing data regarding the manufacturing process to the plurality of relocatable manufacturing stations and for controlling the operation of the plurality of relocatable manufacturing stations and the transport mechanism;
 whereby the plurality of relocatable manufacturing stations are repositioned as needed along the length of the manufacturing line in order to manufacture frozen cone confections having dissimilar manufacturing parameters.

10. A system according to claim 9 further comprising a manufacturing station relocation unit having a drive means operable to automatically relocate the manufacturing station to a different point along the length of the manufacturing line.

11. A system according to claim 10 wherein the drive means includes a servo motor.

12. A system according to claim 9 further comprising one or more robots for performing loading and/or unloading tasks.

13. A system according to claim 9 further comprising one or more additional manufacturing lines.

14. A system according to claim 9 wherein the plurality of relocatable manufacturing stations are automatically repositioned along the length of the manufacturing line as a result of the processor-based control system receiving an input indicating that a particular frozen cone confection is to be manufactured.

15. A system according to claim 14 wherein the input is in the form of a program number that corresponds to a particular frozen cone confection.

16. A system according to claim 14 wherein the input is in the form of a program name that corresponds to a particular frozen cone confection.

17. A system according to claim 9 further comprising a database in communication with the processor-based control system, the database containing manufacturing data relating to one or more different frozen cone confections.

18. A system according to claim 17 wherein the processor-based control system receives manufacturing process control data from the database.

19. A system according to claim 9 wherein the processor-based control system receives manufacturing process control data from a computer readable medium.

20. A system according to claim 9 wherein additional relocatable manufacturing stations can be installed to the manufacturing line.

21. A system according to claim 9 wherein one of the plurality of relocatable manufacturing stations is a rim dipping station that is adapted to coat an open end edge of the conical shells with a coating material while the conical shells are in an inverted position.

22. A system according to claim 9 wherein one of the plurality of relocatable manufacturing stations is a cone coating station that is adapted to coat the interior of the conical shells with a coating material while the conical shells are in an inverted position.

* * * * *